US011785441B2

(12) United States Patent
Wang et al.

(10) Patent No.: US 11,785,441 B2
(45) Date of Patent: Oct. 10, 2023

(54) SIGNALING OF SIDELINK BEAM TRAINING REFERENCE SIGNAL AND SIDELINK DISCOVERY MESSAGE BEFORE BEAM TRAINING RESPONSE

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Junyi Li, Fairless Hills, PA (US); Mahmoud Taherzadeh Boroujeni, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/332,604

(22) Filed: May 27, 2021

(65) Prior Publication Data

US 2022/0386098 A1  Dec. 1, 2022

(51) Int. Cl.
*H04W 8/00* (2009.01)
*H04B 7/06* (2006.01)
*H04B 7/08* (2006.01)
*H04W 16/28* (2009.01)
*H04W 92/18* (2009.01)

(52) U.S. Cl.
CPC .......... *H04W 8/005* (2013.01); *H04B 7/0617* (2013.01); *H04B 7/088* (2013.01); *H04W 16/28* (2013.01); *H04W 92/18* (2013.01)

(58) Field of Classification Search
CPC ..... H04W 8/005; H04W 16/28; H04W 92/18; H04B 7/0617; H04B 7/088

USPC ........................................................ 370/329
See application file for complete search history.

(56) References Cited

U.S. PATENT DOCUMENTS

| 2019/0058986 A1* | 2/2019 | Loehr .................. H04L 1/1825 |
| 2019/0174346 A1* | 6/2019 | Murray ............... H04B 7/0408 |
| 2019/0253867 A1* | 8/2019 | Abedini ............... H04W 16/14 |

(Continued)

FOREIGN PATENT DOCUMENTS

| CN | 110786041 A | * | 2/2020 | ............ H04W 24/10 |
| WO | WO-2018185726 A1 | * | 10/2018 | ........... H04B 17/309 |

OTHER PUBLICATIONS

International Search Report and Written Opinion—PCT/US2022/072589—ISA/EPO—dated Sep. 9, 2022.

*Primary Examiner* — Hassan Kizou
*Assistant Examiner* — Oladiran Gideon Olaleye
(74) *Attorney, Agent, or Firm* — MG-IP Law, P.C.; Nerrie M. Zohn

(57) ABSTRACT

Disclosed are techniques for wireless communication. In an aspect, an originator UE transmits a sidelink beam training (BT) reference signal (BTRS) a first number of times on each of a first set of beams, and a sidelink discovery message a second number of times on each of a second set of beams, wherein each beam from the second set of beams is associated with at least one beam from the first set of beams (e.g., 1:1 or N:1 mapping of first set of beams to second set of beams). At least one responder UE responds by transmitting, after the transmission of the sidelink BTRSs and the sidelink discovery messages, a BT response signal and a sidelink discovery response message on a beam corresponding to one of the first set of beams.

29 Claims, 22 Drawing Sheets

(56) References Cited

U.S. PATENT DOCUMENTS

| | | | |
|---|---|---|---|
| 2019/0253955 A1* | 8/2019 | Abedini | H04B 7/088 |
| 2019/0372647 A1* | 12/2019 | Su | H04W 16/28 |
| 2020/0252990 A1* | 8/2020 | Ganesan | H04B 7/088 |
| 2021/0058914 A1* | 2/2021 | Chae | H04B 7/0695 |
| 2021/0168574 A1* | 6/2021 | Zhang | H04L 5/0048 |
| 2021/0212051 A1* | 7/2021 | Raghavan | H04L 5/005 |
| 2021/0410084 A1* | 12/2021 | Li | H04W 52/265 |
| 2022/0069884 A1* | 3/2022 | Zhang | H04B 17/318 |
| 2022/0174655 A1* | 6/2022 | Tsai | H04W 48/16 |

* cited by examiner

SIGNALING OF SIDELINK BEAM TRAINING REFERENCE SIGNAL AND SIDELINK DISCOVERY MESSAGE BEFORE BEAM TRAINING RESPONSE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Sidelink communication may be implemented over higher bands (e.g., FR2, FR2x, FR4), which may complicate the discovery process (e.g., such that beam training is required). UEs on sidelink need to discovery each other to setup a connection. In some designs, UEs need to perform beam training during the discovery procedure, particularly for discovery over higher bands as noted above. In some designs, without beam training, it is difficult for UEs to communicate the sidelink discovery messages and sidelink discovery response messages. In some legacy designs, beam training is performed before the sidelink discovery message is communicated. Hence, all candidate responder UEs that detect a beam training (BT) reference signal (BTRS) may transmit the BT response (e.g., because the candidate responder UEs do not yet know if they are interested in connecting to the initiator UE). This creates high system overhead in scenarios where candidate responder UEs perform beam training and transmit BT responses, but ultimately receive the sidelink discovery message and decide not to connect (e.g., no sidelink discovery response message is sent).

Aspects of the disclosure are directed to a discovery procedure whereby an initiator UE transmits sidelink discovery message(s) and BTRS(s) before a BT response is received from candidate responder UEs. In this case, the candidate responder UEs have an opportunity to review the sidelink discovery message(s) before transmission of a BT response. Such aspects may provide various technical advantages, such as reducing discovery overhead, reducing spectral interference, and so on.

In an aspect, a method of operating an initiator user equipment (UE) includes transmitting a sidelink beam training (BT) reference signal (BTRS) a first number of times on each of a first set of beams; transmitting a sidelink discovery message a second number of times on each of a second set of beams, wherein each beam from the second set of beams is associated with at least one beam from the first set of beams; and receiving, from at least one responder UE after the transmission of the sidelink BTRSs and the sidelink discovery messages, a BT response signal and a sidelink discovery response message on a beam corresponding to one of the first set of beams.

In some aspects, the transmission of the sidelink discovery messages follows the transmission of the sidelink BTRSs.

In some aspects, the transmission of the sidelink BTRSs follows the transmission of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are transmitted in order between successively adjacent beams among the first set of beams, or the sidelink discovery messages are transmitted in order between successively adjacent beams among the second set of beams, or a combination thereof.

In some aspects, the sidelink BTRSs are transmitted via interleaving of the first set of beams, or the sidelink discovery messages are transmitted via interleaving of the second set of beams, or a combination thereof.

In some aspects, the BT response signal comprises a preamble or a message.

In an aspect, a method of operating responder user equipment (UE) includes receiving, from an initiator UE, a sidelink beam training (BT) reference signal (BTRS) a first number of times on each of a first set of beams; receiving, from the initiator UE, a sidelink discovery message a second number of times on each of a second set of beams, wherein each beam from the second set of beams is associated with at least one beam from the first set of beams; and transmitting, to the initiator UE, a BT response signal and a sidelink discovery response message on a beam that corresponds to one of the first set of beams.

In some aspects, the reception of the sidelink discovery messages follows the reception of the sidelink BTRSs.

In some aspects, the reception of the sidelink BTRSs follows the reception of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are received in order between successively adjacent beams among the first set of beams, or the sidelink discovery messages are received in order between successively adjacent beams among the second set of beams, or a combination thereof.

In some aspects, the sidelink BTRSs are received via interleaving of the first set of beams, or the sidelink discovery messages are received via interleaving of the second set of beams, or a combination thereof.

In some aspects, the BT response signal comprises a preamble or a message.

In an aspect, an initiator user equipment (UE) includes a memory; at least one transceiver; and at least one processor communicatively coupled to the memory and the at least one transceiver, the at least one processor configured to: transmit, via the at least one transceiver, a sidelink beam training (BT) reference signal (BTRS) a first number of times on each of a first set of beams; transmit, via the at least one transceiver, a sidelink discovery message a second number of times on each of a second set of beams, wherein each beam from the second set of beams is associated with at least one beam from the first set of beams; and receive, via the at least one transceiver, from at least one responder UE after the transmission of the sidelink BTRSs and the sidelink discovery messages, a BT response signal and a sidelink discovery response message on a beam corresponding to one of the first set of beams.

In some aspects, the transmission of the sidelink discovery messages follows the transmission of the sidelink BTRSs.

In some aspects, the transmission of the sidelink BTRSs follows the transmission of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are transmitted in order between successively adjacent beams among the first set of beams, or the sidelink discovery messages are transmitted in order between successively adjacent beams among the second set of beams, or a combination thereof.

In some aspects, the sidelink BTRSs are transmitted via interleaving of the first set of beams, or the sidelink discovery messages are transmitted via interleaving of the second set of beams, or a combination thereof.

In some aspects, the BT response signal comprises a preamble or a message.

In an aspect, a responder user equipment (UE) includes a memory; at least one transceiver; and at least one processor communicatively coupled to the memory and the at least one transceiver, the at least one processor configured to: receive, via the at least one transceiver, from an initiator UE, a sidelink beam training (BT) reference signal (BTRS) a first number of times on each of a first set of beams; receive, via the at least one transceiver, from the initiator UE, a sidelink discovery message a second number of times on each of a second set of beams, wherein each beam from the second set of beams is associated with at least one beam from the first set of beams; and transmit, via the at least one transceiver, to the initiator UE, a BT response signal and a sidelink discovery response message on a beam that corresponds to one of the first set of beams.

In some aspects, the reception of the sidelink discovery messages follows the reception of the sidelink BTRSs.

In some aspects, the reception of the sidelink BTRSs follows the reception of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are received in order between successively adjacent beams among the first set of beams, or the sidelink discovery messages are received in order between successively adjacent beams among the second set of beams, or a combination thereof.

In some aspects, the sidelink BTRSs are received via interleaving of the first set of beams, or the sidelink discovery messages are received via interleaving of the second set of beams, or a combination thereof.

In some aspects, the BT response signal comprises a preamble or a message.

In an aspect, an initiator user equipment (UE) includes means for transmitting a sidelink beam training (BT) reference signal (BTRS) a first number of times on each of a first set of beams; means for transmitting a sidelink discovery message a second number of times on each of a second set of beams, wherein each beam from the second set of beams is associated with at least one beam from the first set of beams; and means for receiving, from at least one responder UE after the transmission of the sidelink BTRSs and the sidelink discovery messages, a BT response signal and a sidelink discovery response message on a beam corresponding to one of the first set of beams.

In some aspects, the transmission of the sidelink discovery messages follows the transmission of the sidelink BTRSs.

In some aspects, the transmission of the sidelink BTRSs follows the transmission of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are transmitted in order between successively adjacent beams among the first set of beams, or the sidelink discovery messages are transmitted in order between successively adjacent beams among the second set of beams, or a combination thereof.

In some aspects, the sidelink BTRSs are transmitted via interleaving of the first set of beams, or the sidelink discovery messages are transmitted via interleaving of the second set of beams, or a combination thereof.

In some aspects, the BT response signal comprises a preamble or a message.

In an aspect, a responder user equipment (UE) includes means for receiving, from an initiator UE, a sidelink beam training (BT) reference signal (BTRS) a first number of times on each of a first set of beams; means for receiving, from the initiator UE, a sidelink discovery message a second number of times on each of a second set of beams, wherein each beam from the second set of beams is associated with at least one beam from the first set of beams; and means for transmitting, to the initiator UE, a BT response signal and a sidelink discovery response message on a beam that corresponds to one of the first set of beams.

In some aspects, the reception of the sidelink discovery messages follows the reception of the sidelink BTRSs.

In some aspects, the reception of the sidelink BTRSs follows the reception of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are received in order between successively adjacent beams among the first set of beams, or the sidelink discovery messages are received in order between successively adjacent beams among the second set of beams, or a combination thereof.

In some aspects, the sidelink BTRSs are received via interleaving of the first set of beams, or the sidelink discovery messages are received via interleaving of the second set of beams, or a combination thereof.

In some aspects, the BT response signal comprises a preamble or a message.

In an aspect, a non-transitory computer-readable medium storing computer-executable instructions that, when executed by an initiator user equipment (UE), cause the UE to: transmit a sidelink beam training (BT) reference signal (BTRS) a first number of times on each of a first set of beams; transmit a sidelink discovery message a second number of times on each of a second set of beams, wherein each beam from the second set of beams is associated with at least one beam from the first set of beams; and receive, from at least one responder UE after the transmission of the sidelink BTRSs and the sidelink discovery messages, a BT response signal and a sidelink discovery response message on a beam corresponding to one of the first set of beams.

In some aspects, the transmission of the sidelink discovery messages follows the transmission of the sidelink BTRSs.

In some aspects, the transmission of the sidelink BTRSs follows the transmission of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are transmitted in order between successively adjacent beams among the first set of beams, or the sidelink discovery messages are transmitted in order between successively adjacent beams among the second set of beams, or a combination thereof.

In some aspects, the sidelink BTRSs are transmitted via interleaving of the first set of beams, or the sidelink discovery messages are transmitted via interleaving of the second set of beams, or a combination thereof.

In some aspects, the BT response signal comprises a preamble or a message.

In an aspect, a non-transitory computer-readable medium storing computer-executable instructions that, when executed by a responder user equipment (UE), cause the UE to: receive, from an initiator UE, a sidelink beam training (BT) reference signal (BTRS) a first number of times on each of a first set of beams; receive, from the initiator UE, a sidelink discovery message a second number of times on each of a second set of beams, wherein each beam from the second set of beams is associated with at least one beam from the first set of beams; and transmit, to the initiator UE, a BT response signal and a sidelink discovery response message on a beam that corresponds to one of the first set of beams.

In some aspects, the reception of the sidelink discovery messages follows the reception of the sidelink BTRSs.

In some aspects, the reception of the sidelink BTRSs follows the reception of the sidelink discovery messages.

In some aspects, the first number of times is the same as the second number of times.

In some aspects, the first number of times is greater than the second number of times.

In some aspects, each beam among the first set of beams is associated with the same width as each beam among the second set of beams.

In some aspects, there is a 1:1 mapping between the first set of beams and the second set of beams.

In some aspects, each beam among the first set of beams is associated with a first width, and each beam among the second set of beams is associated with a second width that is wider than the first width.

In some aspects, there is a N:1 mapping between the first set of beams and the second set of beams, with N being greater than 1.

In some aspects, two or more beams among the first set of beams correspond to a single beam among the second set of beams.

In some aspects, the sidelink BTRSs are received in order between successively adjacent beams among the first set of beams, or the sidelink discovery messages are received in order between successively adjacent beams among the second set of beams, or a combination thereof.

In some aspects, the sidelink BTRSs are received via interleaving of the first set of beams, or the sidelink discovery messages are received via interleaving of the second set of beams, or a combination thereof.

In some aspects, the BT response signal comprises a preamble or a message.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
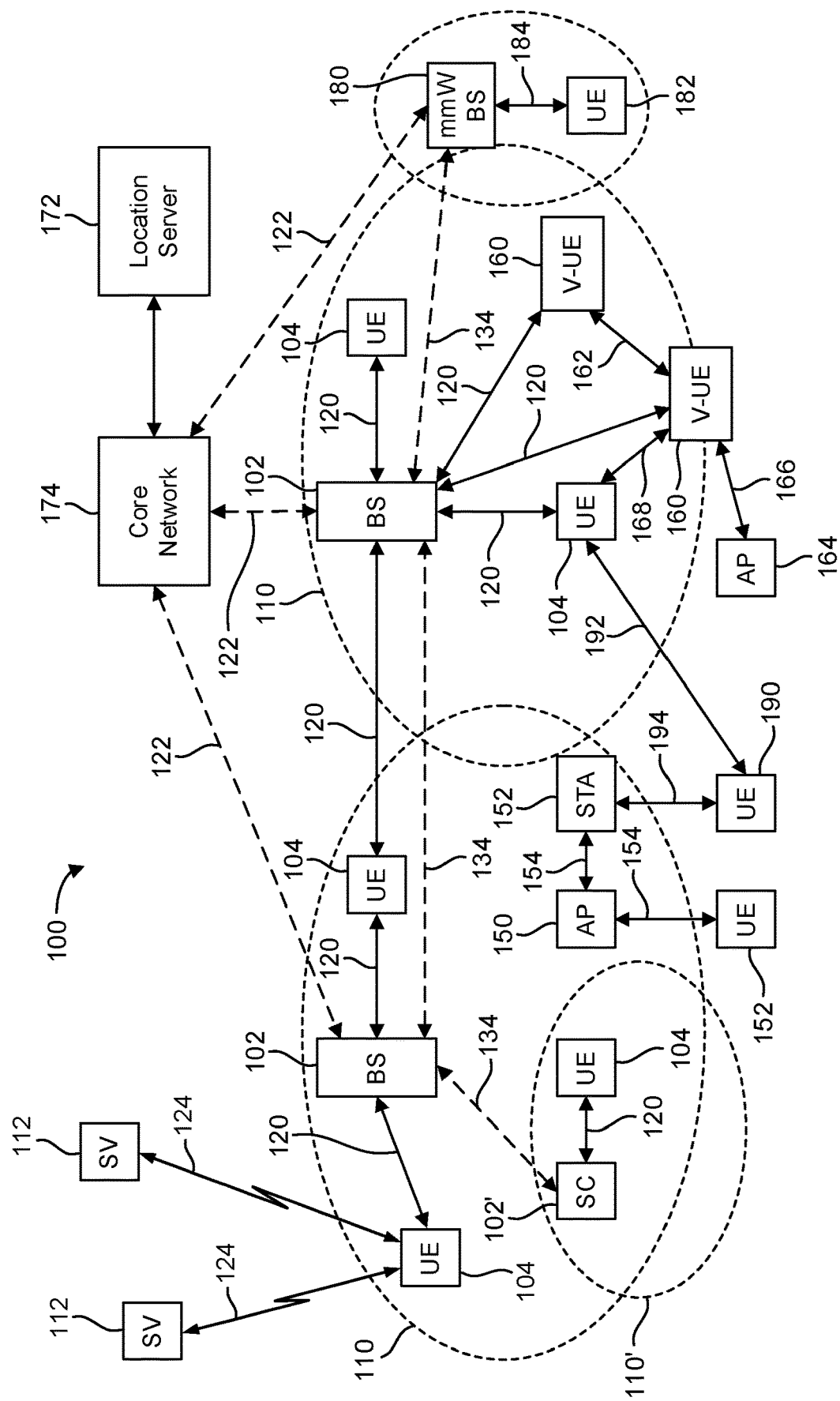
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
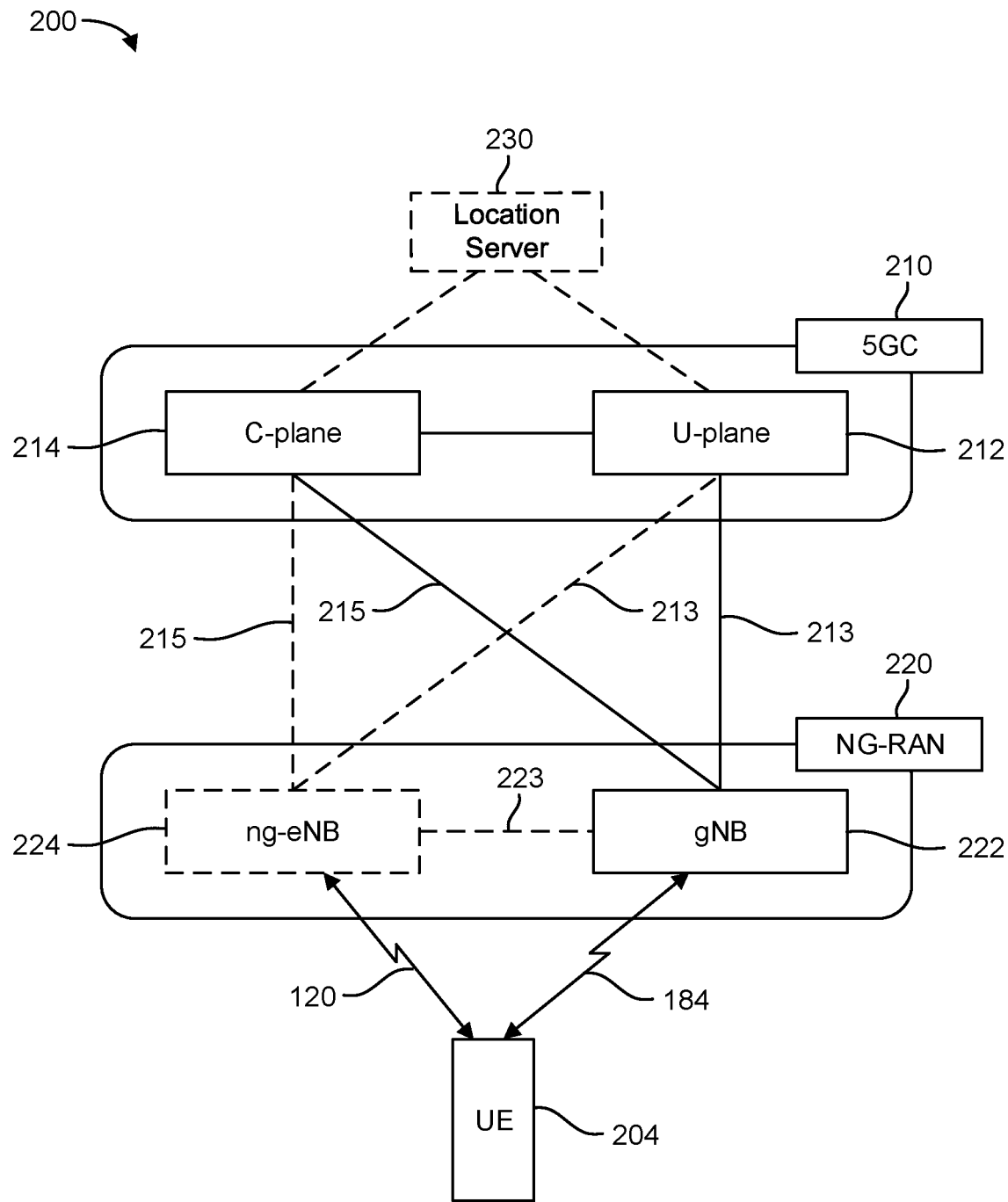
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
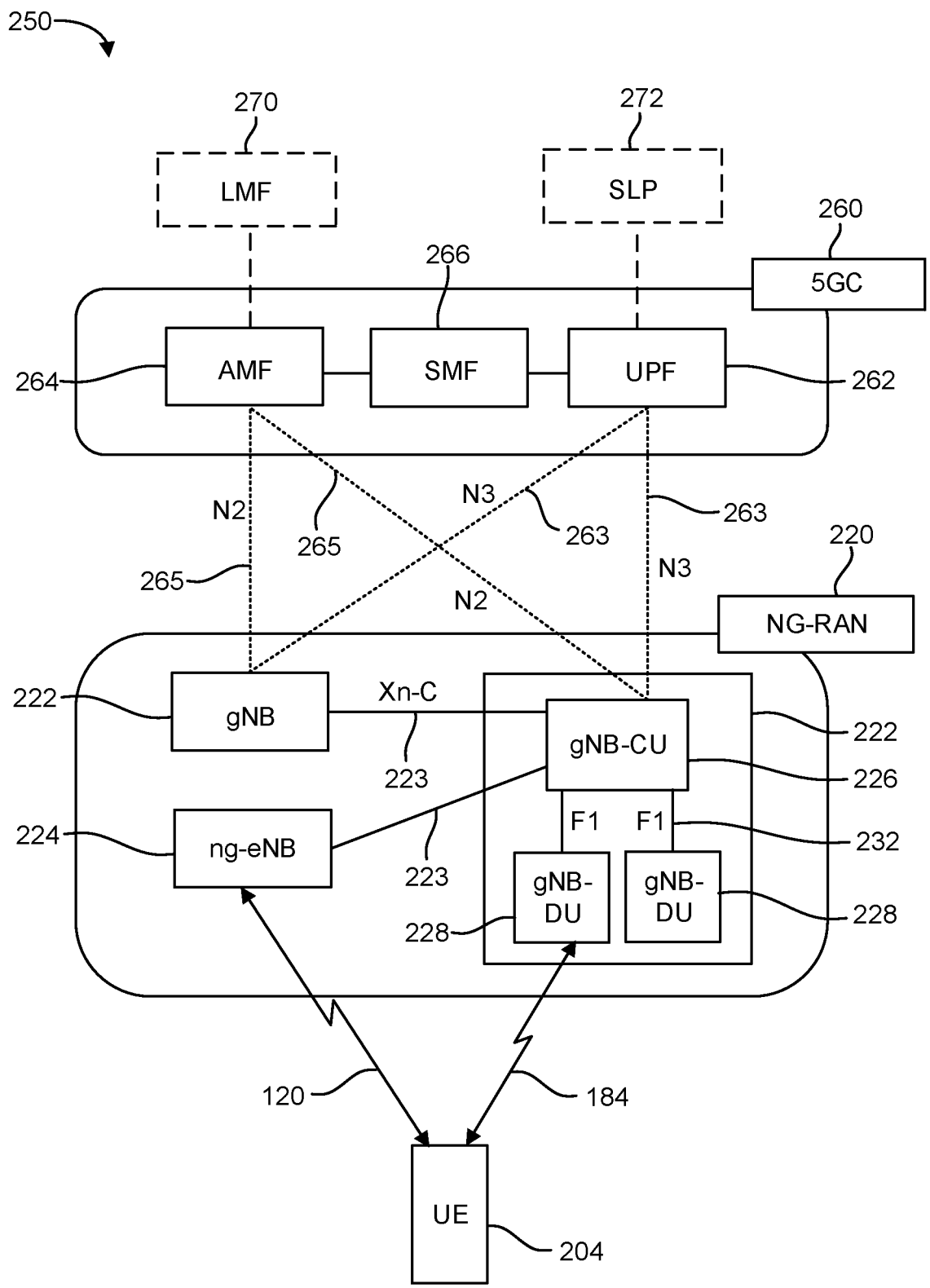

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
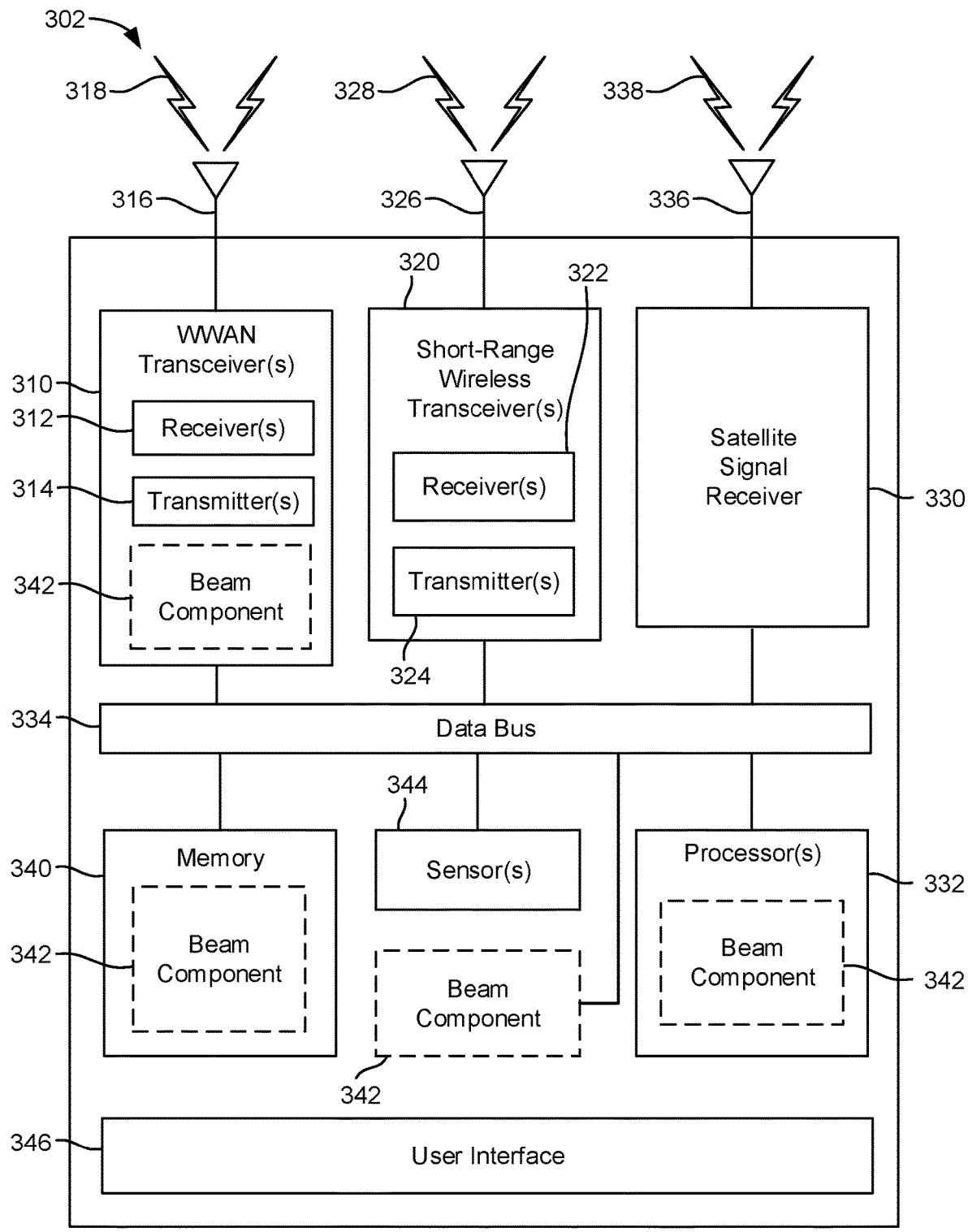
FIGS. 3A, 3B, and 3C are simplified block diagrams of several sample aspects of components that may be employed in a user equipment (UE), a base station, and a network entity, respectively, and configured to support communications as taught herein.
Figure 3B:
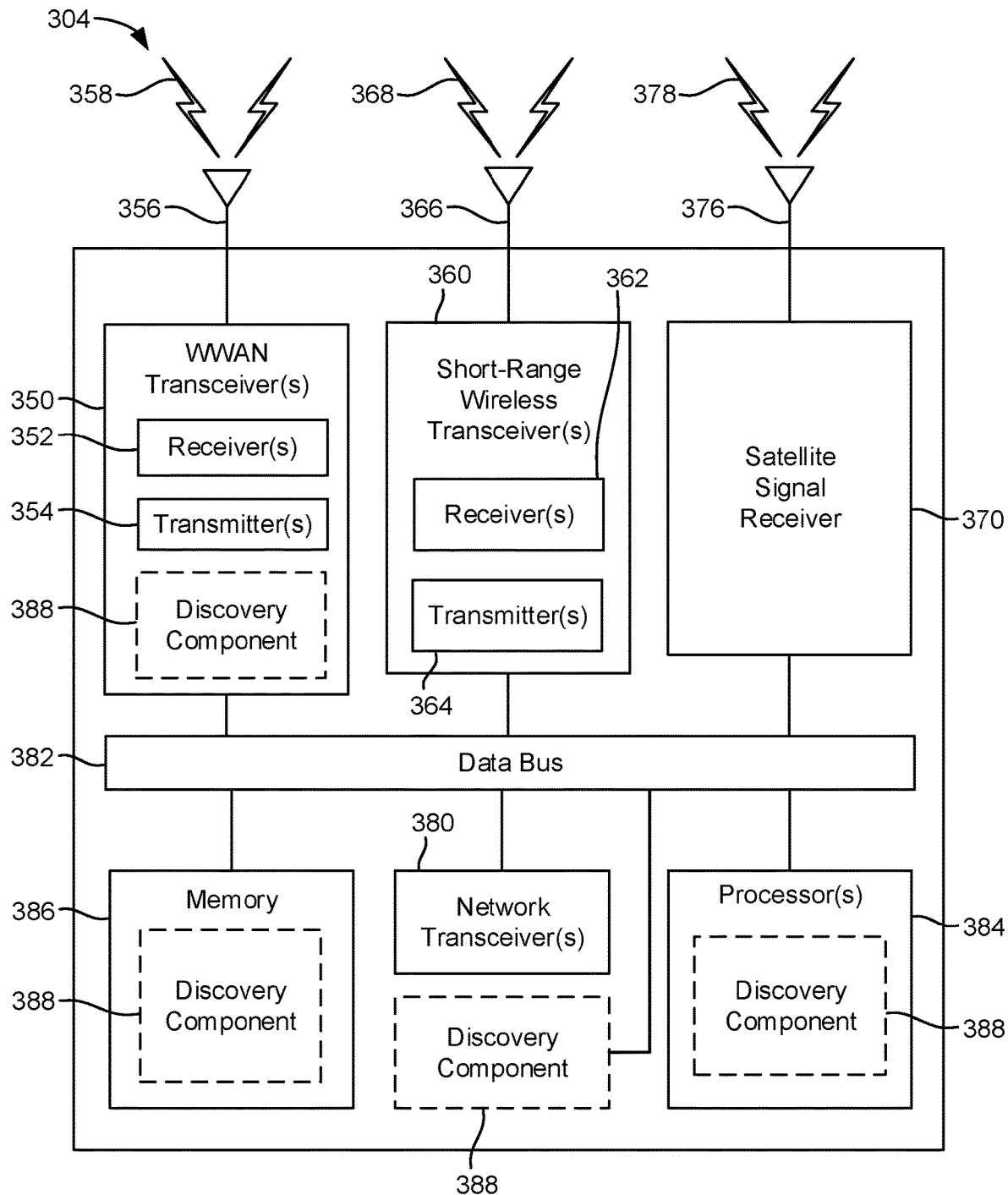
Figure 3C:
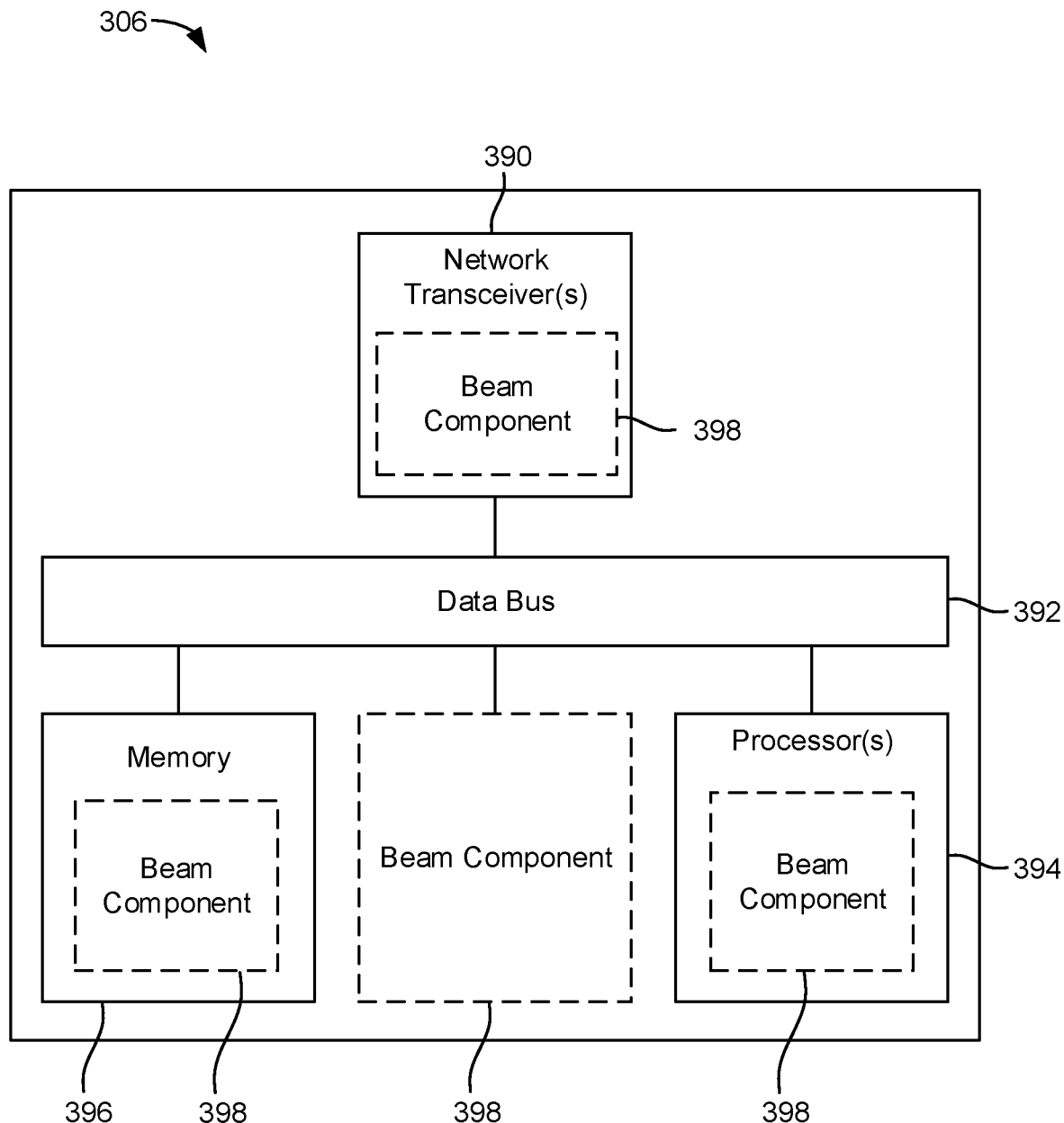

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Discovery component 342, 388, and 398, respectively. The Discovery component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Discovery component 342, 388, and 398 may be external to the processors 332, 384, and 394 (e.g., part of a modem processing system, integrated with another processing system, etc.). Alternatively, the Discovery component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Discovery component 342, which may be, for example, part of the one or more WWAN transceivers 310, the memory 340, the one or more processors 332, or any combination thereof, or may be a standalone component. FIG. 3B illustrates possible locations of the Discovery component 388, which may be, for example, part of the one or more WWAN transceivers 350, the memory 386, the one or more processors 384, or any combination thereof, or may be a standalone component. FIG. 3C illustrates possible locations of the Discovery component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Discovery component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
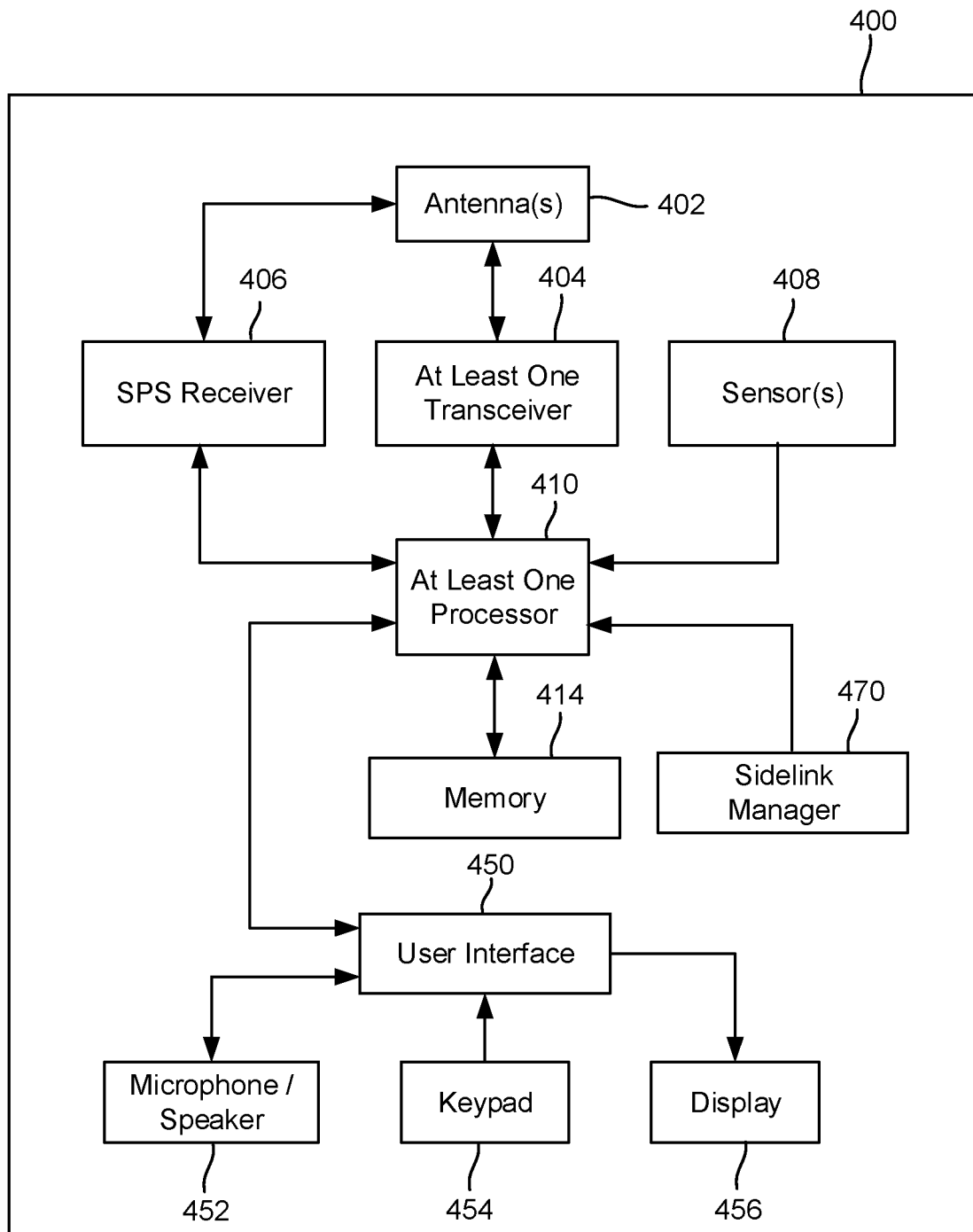
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
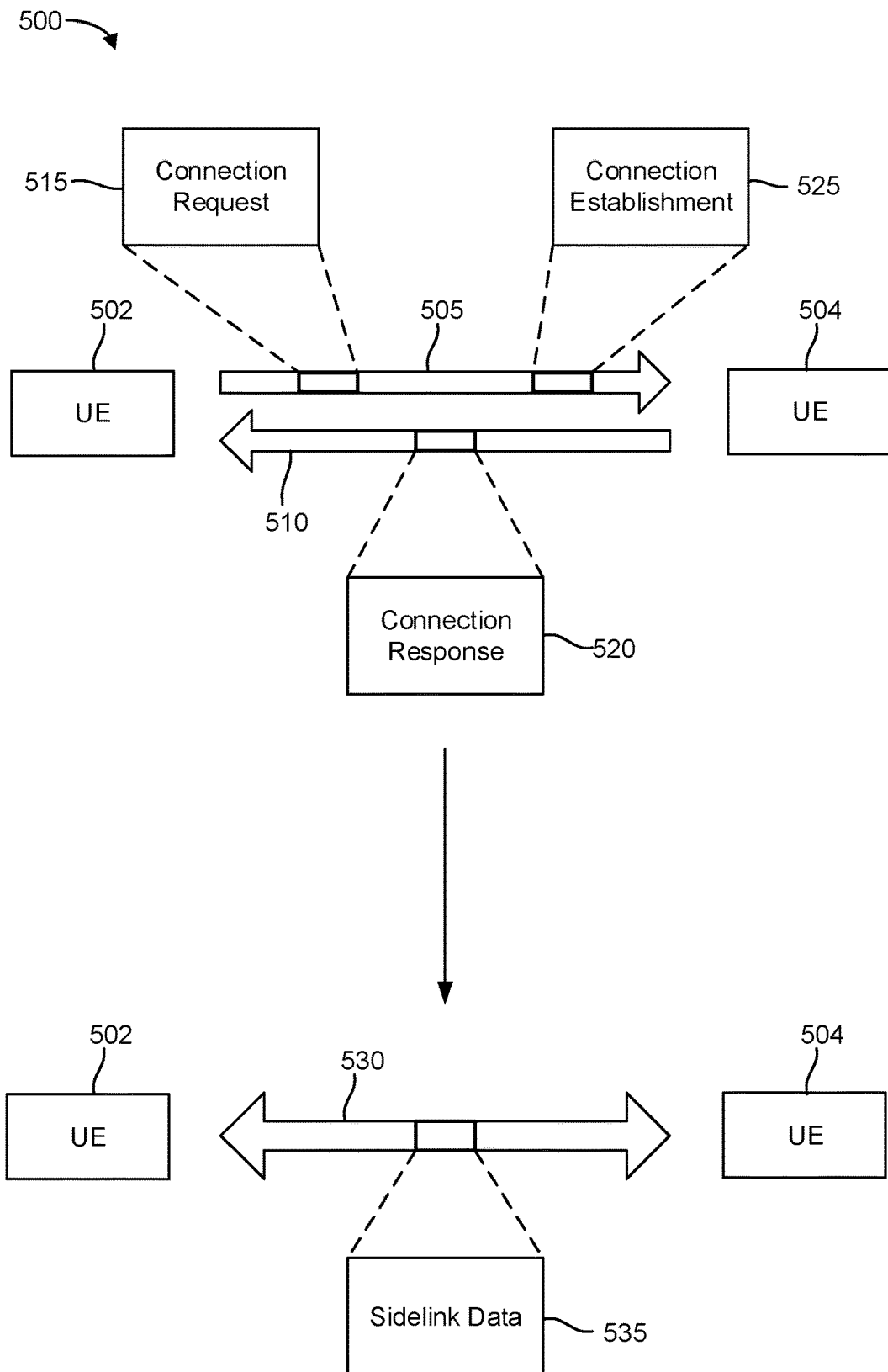
FIG. 5 illustrates an example of a wireless communications system that supports unicast sidelink establishment, according to aspects of the disclosure.

FIG. 5 illustrates an example of a wireless communications system 500 that supports wireless unicast sidelink establishment, according to aspects of the disclosure. In some examples, wireless communications system 500 may implement aspects of wireless communications systems 100, 200, and 250. Wireless communications system 500 may include a first UE 502 and a second UE 504, which may be examples of any of the UEs described herein. As specific examples, UEs 502 and 504 may correspond to V-UEs 160 in FIG. 1, UE 190 and UE 104 in FIG. 1 connected over D2D P2P link 192, or UEs 204 in FIGS. 2A and 2B.

In the example of FIG. 5, the UE 502 may attempt to establish a unicast connection over a sidelink with the UE 504, which may be a V2X sidelink between the UE 502 and UE 504. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 502 may be referred to as an initiating UE that initiates the sidelink connection procedure, and the UE 504 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 502 and UE 504. For example, a transmission and reception capability matching may be negotiated between the UE 502 and UE 504. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 502 and UE 504. Additionally, a security association may be established between UE 502 and UE 504 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 502 and UE 504.

In some cases, UE 504 may create a service announcement (e.g., a service capability message) to transmit over a cellular network (e.g., cV2X) to assist the sidelink connection establishment. Conventionally, UE 502 may identify and locate candidates for sidelink communications based on a basic service message (BSM) broadcasted unencrypted by nearby UEs (e.g., UE 504). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 502 is able to detect the BSM(s). Accordingly, the service announcement transmitted by UE 504 and other nearby UEs (e.g., a discovery signal) may be an upper layer signal and broadcasted (e.g., in an NR sidelink broadcast). In some cases, the UE 504 may include one or more parameters for itself in the service announcement, including connection parameters and/or capabilities it possesses. The UE 502 may then monitor for and receive the broadcasted service announcement to identify potential UEs for corresponding sidelink connections. In some cases, the UE 502 may identify the potential UEs based on the capabilities each UE indicates in their respective service announcements.

The service announcement may include information to assist the UE 502 (e.g., or any initiating UE) to identify the UE transmitting the service announcement (UE 504 in the example of FIG. 5). For example, the service announcement may include channel information where direct communication requests may be sent. In some cases, the channel information may be RAT-specific (e.g., specific to LTE or NR) and may include a resource pool within which UE 502 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 502 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 504 in the example of FIG. 5), the initiating UE (UE 502 in the example of FIG. 5) may transmit a connection request 515 to the identified target UE 504. In some cases, the connection request 515 may be a first RRC message transmitted by the UE 502 to request a unicast connection with the UE 504 (e.g., an "RRCDirectConnectionSetupRequest" message). For example, the unicast connection may utilize the PC5 interface for the sidelink, and the connection request 515 may be an RRC connection setup request message. Additionally, the UE 502 may use a sidelink signaling radio bearer 505 to transport the connection request 515.

After receiving the connection request 515, the UE 504 may determine whether to accept or reject the connection request 515. The UE 504 may base this determination on a transmission/reception capability, an ability to accommodate the unicast connection over the sidelink, a particular service indicated for the unicast connection, the contents to be transmitted over the unicast connection, or a combination thereof. For example, if the UE 502 wants to use a first RAT to transmit or receive data, but the UE 504 does not support the first RAT, then the UE 504 may reject the connection request 515. Additionally or alternatively, the UE 504 may reject the connection request 515 based on being unable to accommodate the unicast connection over the sidelink due to limited radio resources, a scheduling issue, etc. Accordingly, the UE 504 may transmit an indication of whether the request is accepted or rejected in a connection response 520. Similar to the UE 502 and the connection request 515, the UE 504 may use a sidelink signaling radio bearer 510 to transport the connection response 520. Additionally, the connection response 520 may be a second RRC message transmitted by the UE 504 in response to the connection request 515 (e.g., an "RRCDirectConnectionResponse" message).

In some cases, sidelink signaling radio bearers 505 and 510 may be the same sidelink signaling radio bearer or may be separate sidelink signaling radio bearers. Accordingly, a radio link control (RLC) layer acknowledged mode (AM) may be used for sidelink signaling radio bearers 505 and 510. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 520 indicates that the UE 504 accepted the connection request 515, the UE 502 may then transmit a connection establishment 525 message on the sidelink signaling radio bearer 505 to indicate that the unicast connection setup is complete. In some cases, the connection establishment 525 may be a third RRC message (e.g., an "RRCDirectConnectionSetupComplete" message). Each of the connection request 515, the connection response 520, and the connection establishment 525 may use a basic capability when being transported from one UE to the other UE to enable each UE to be able to receive and decode the corresponding transmission (e.g., the RRC messages).

Additionally, identifiers may be used for each of the connection request 515, the connection response 520, and the connection establishment 525. For example, the identifiers may indicate which UE 502/504 is transmitting which message and/or for which UE 502/504 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 515 and/or the connection response 520 for UE 502 and/or UE 504, respectively, to enable negotiation of corresponding AS layer parameters for the unicast connection. For example, the UE 502 and/or UE 504 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 502 and/or UE 504 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 502 and/or UE 504 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (HACK) feedback), parameters for the HARQ feedback scheme, carrier aggregation, or a combination thereof for the unicast connection. Additionally, the UE 502 and/or UE 504 may include PHY layer parameters when establishing the unicast connection to set a PHY layer context for the unicast connection. For example, the PHY layer context may indicate a transmission format (unless transmission profiles are included for each UE 502/504) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 525 message is transmitted). Before a security association (e.g., security context) is established between the UE 502 and UE 504, the sidelink signaling radio bearers 505 and 510 may not be protected. After a security association is established, the sidelink signaling radio bearers 505 and 510 may be protected. Accordingly, the security context may enable secure data transmissions over the unicast connection and the sidelink signaling radio bearers 505 and 510. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 504 may base its decision on whether to accept or reject the connection request 515 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 502 and UE 504 may communicate using the unicast connection over a sidelink 530, where sidelink data 535 is transmitted between the two UEs 502 and 504. The sidelink 530 may correspond to sidelinks 162 and/or 168 in FIG. 1. In some cases, the sidelink data 535 may include RRC messages transmitted between the two UEs 502 and 504. To maintain this unicast connection on sidelink 530, UE 502 and/or UE 504 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 502 or by both UE 502 and UE 504. Additionally or alternatively, a MAC control element (CE) (e.g., defined over sidelink 530) may be used to monitor the status of the unicast connection on sidelink 530 and maintain the connection. When the unicast connection is no longer needed (e.g., UE 502 travels far enough away from UE 504), either UE 502 and/or UE 504 may start a release procedure to drop the unicast connection over sidelink 530. Accordingly, subsequent RRC messages may not be transmitted between UE 502 and UE 504 on the unicast connection.

Figure 6:
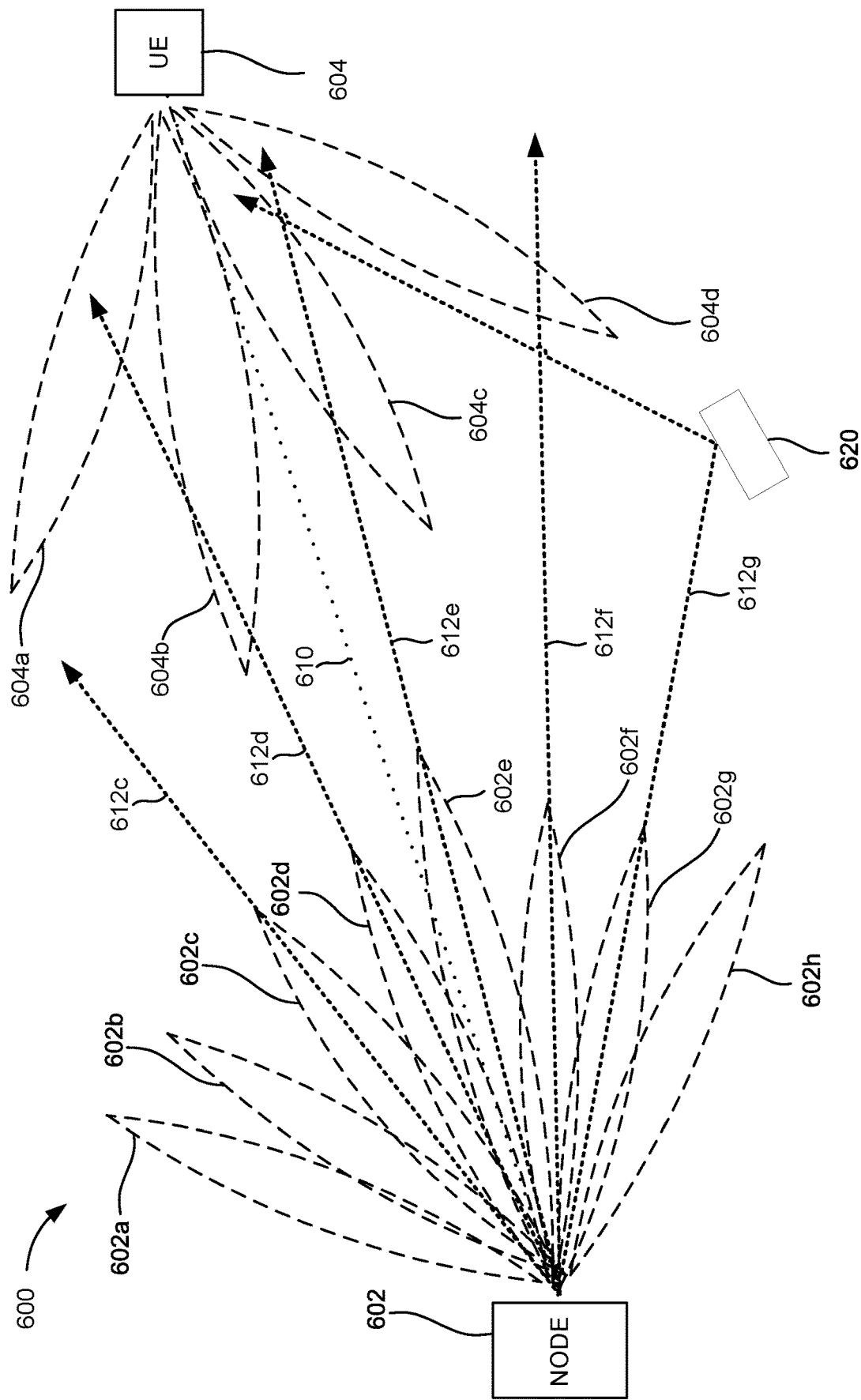
FIG. 6 is a diagram illustrating an example wireless node in communication with an example UE, according to aspects of the disclosure.

FIG. 6 is a diagram 600 illustrating a wireless node 602 (which may correspond to any of the base stations described herein, or alternatively to any of the UEs described herein) in communication with a UE 604 (which may correspond to any of the UEs described herein). In a scenario where the wireless node 602 corresponds to a UE, the signaling described below may be characterized as sidelink signaling.

Referring to FIG. 6, the wireless node 602 may transmit a beamformed signal to the UE 604 on one or more transmit beams 602a, 602b, 602c, 602d, 602e, 602f, 602g, 602h, each having a beam identifier that can be used by the UE 604 to identify the respective beam. Where the wireless node 602 is beamforming towards the UE 604 with a single array of antennas (e.g., a single TRP/cell or UE), the wireless node 602 may perform a "beam sweep" by transmitting first beam 602a, then beam 602b, and so on until lastly transmitting beam 602h. Alternatively, the wireless node 602 may transmit beams 602a-602h in some pattern, such as beam 602a, then beam 602h, then beam 602b, then beam 602g, and so on. Where the wireless node 602 is beamforming towards the UE 604 using multiple arrays of antennas (e.g., multiple TRPs/cells), each antenna array may perform a beam sweep of a subset of the beams 602a-602h. Alternatively, each of beams 602a-602h may correspond to a single antenna or antenna array.

FIG. 6 further illustrates the paths 612c, 612d, 612e, 612f, and 612g followed by the beamformed signal transmitted on beams 602c, 602d, 602e, 602f, and 602g, respectively. Each path 612c, 612d, 612e, 612f, 612g may correspond to a single "multipath" or, due to the propagation characteristics of radio frequency (RF) signals through the environment, may be comprised of a plurality (a cluster) of "multipaths." Note that although only the paths for beams 602c-602g are shown, this is for simplicity, and the signal transmitted on each of beams 602a-602h will follow some path. In the example shown, the paths 612c, 612d, 612e, and 612f are straight lines, while path 612g reflects off an obstacle 620 (e.g., a building, vehicle, terrain feature, etc.).

The UE 604 may receive the beamformed signal from the wireless node 602 on one or more receive beams 604a, 604b, 604c, 604d. Note that for simplicity, the beams illustrated in FIG. 6 represent either transmit beams or receive beams, depending on which of the wireless node 602 and the UE 604 is transmitting and which is receiving. Thus, the UE 604 may also transmit a beamformed signal to the wireless node 602 on one or more of the beams 604a-604d, and the wireless node 602 may receive the beamformed signal from the UE 604 on one or more of the beams 602a-602h.

In an aspect, the wireless node 602 and the UE 604 may perform beam training to align the transmit and receive beams of the wireless node 602 and the UE 604. For example, depending on environmental conditions and other factors, the wireless node 602 and the UE 604 may determine that the best transmit and receive beams are 602d and 604b, respectively, or beams 602e and 604c, respectively. The direction of the best transmit beam for the wireless node 602 may or may not be the same as the direction of the best receive beam, and likewise, the direction of the best receive beam for the UE 604 may or may not be the same as the direction of the best transmit beam.

In the example of FIG. 6, if the wireless node 602 transmits reference signals to the UE 604 on beams 602c, 602d, 602e, 602f, and 602g, then transmit beam 602e is best aligned with the LOS path 610, while transmit beams 602c, 602d, 602f, and 602g are not. As such, beam 602e is likely to have a higher received signal strength at the UE 604 than beams 602c, 602d, 602f, and 602g. Note that the reference signals transmitted on some beams (e.g., beams 602c and/or 602f) may not reach the UE 604, or energy reaching the UE 604 from these beams may be so low that the energy may not be detectable or at least can be ignored.

In some designs, UE 604 can report the received signal strength, and optionally, the associated measurement quality, of each measured transmit beam 602c-602g to the wireless node 602, or alternatively, the identity of the transmit beam having the highest received signal strength (beam 602e in the example of FIG. 6). Alternatively, in case of sidelink, this operation can be reversed, and the wireless node 602 (e.g., a UE, for a sidelink implementation of FIG. 6) can report the received signal strength, and optionally, the associated measurement quality, of each measured transmit beam 604a-604d to the UE 604 or alternatively, the identity of the transmit beam having the highest received signal strength (beam 604b or 604c in the example of FIG. 6).

Various proximity services (ProSe) models may be implemented for direct sidelink discovery. In ProSe Model A, two roles are defined for the ProSe-enabled UEs that are participating in ProSe Direct Discovery. An announcing UE announces certain information that could be used by UEs in proximity that have permission to discover, and a monitoring UE monitors certain information of interest in proximity of announcing UEs. In ProSe Model A, the announcing UE broadcasts discovery messages at pre-defined discovery intervals and the monitoring UEs that are interested in these messages read and process the messages. In ProSe Model B, two roles are defined for the ProSe-enabled UEs that are participating in ProSe direct discovery. In particular, a discoverer UE transmits a request containing certain information about what the discoverer UE is interested to discover, and a discoveree UE receives the request message and can respond with some information related to the discoverer's request. Discoverer UE sends information about other UEs that would like to receive responses from, e.g., the information can be about a ProSe Application Identity corresponding to a group and the members of the group can respond.

Figure 7:
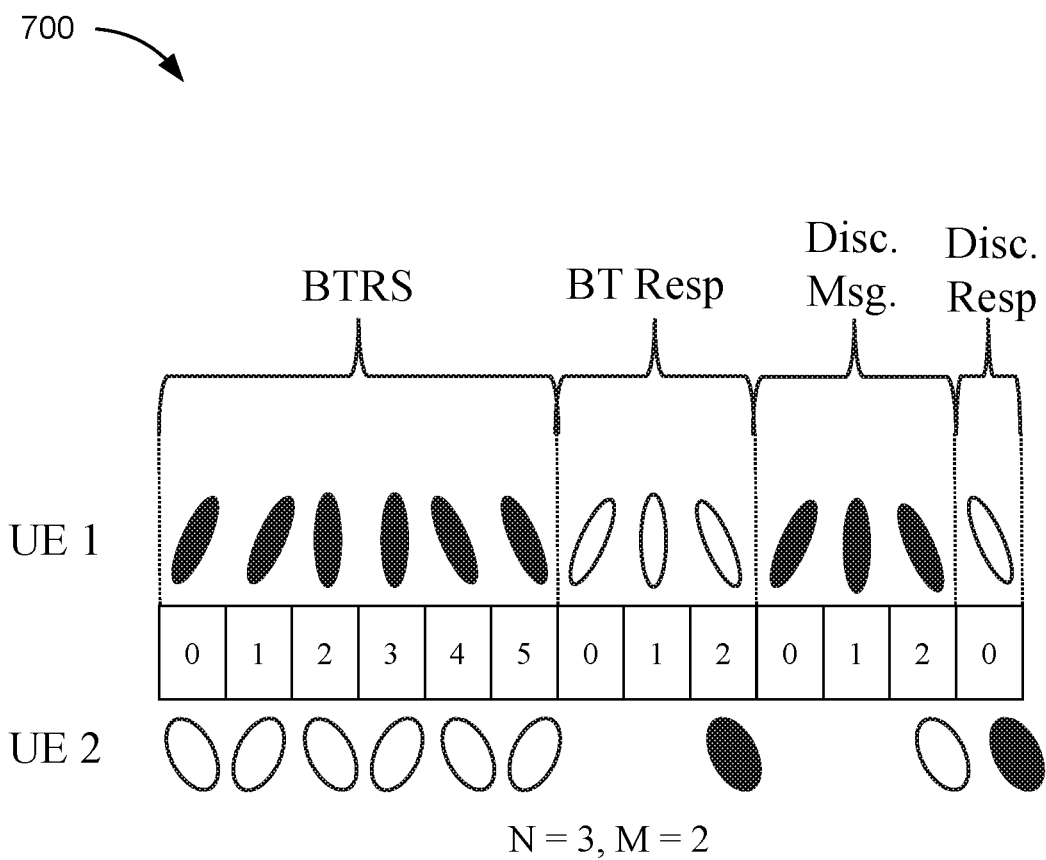
FIG. 7 illustrates a discovery procedure in accordance with aspects of the disclosure.

FIG. 7 illustrates a discovery procedure 700 in accordance with aspects of the disclosure. Referring to FIG. 7, UE 1 transmits upon N transmit beams (N=3) with M repetitions (M=2) per beam across 6 total slots (M×N=2×3=6). In some designs, M=2 may be based on an expectation that the candidate responder UEs (e.g., UE 2) are monitoring for sidelink discovery messages on two receive beams (e.g., alternating between the respective receive beams). In other words, repeating BTRS M times will ensure that a responder UE with M receive beams will have a chance to detect BTRS on each of its receive beams. UE 2 receives the beam sweeping of BTRS on some or all of the N beams and selects the beam among UE 2's M beams with correspondence to the best BTRS beam (i.e., the selected beam is now paired with the best BTRS beam). UE 2 transmits a BT response (e.g., preamble or message) on the selected beam. UE 1 receives the BT response, and transmits a sidelink discovery message on the N transmit beams. UE 2 receives the sidelink discovery message on the beam corresponding to the best BTRS beam, and then transmits a sidelink discovery response message on the selected beam. In other designs, UE 2 may beam sweep the BT response instead of transmitting the BT response on the selected beam (e.g., if there is no correspondence between the BTRS and time).

Referring to FIG. 7, in some designs, the BT response may be RACH-like or CSI-RS-like. In some designs, the BT response includes the sidelink discovery message, in which case the BT response may be transmitted over PSCCH or PSSCH. In some designs, the BT response includes a preamble only, in which case the BT response preamble may be transmitted as a standalone transmission (e.g., similar to CSI-RS, and not part of PSCCH or PSSCH). In some designs, the sidelink discovery message may include information about the corresponding BTRS and BT response sequences.

Referring to FIG. 7, the overhead is N×M×BTRS+N×U× BT_Resp+N×DISC+V×DISC_Resp, where N is the number of Tx beams, M is the number of Rx beams, U is the number of UEs, V is the number of target UEs, BTRS, BT_Resp, DISC and DISC_Resp are the overhead of beam training reference signal, beam training response preamble, discovery message and discovery response message respectively.

N×M×BTRS because UE 1 sends BTRS N×M times.

N×U×BT_Resp because all the UEs need to respond to UE 1, and UE 1 need to receive the response from all directions.

N×DISC because it is likely UE 1 receives response preamble from all directions, UE 1 sends discovery message in all directions, especially when U is large.

V×DISC_Resp because the beam pair between UE 1 and UE 2 has been established, the discovery response does not require beam sweeping.

In some designs, sidelink-Synchronization Signal (S-SS)/ physical sidelink broadcast channel (PSBCH) block occupies 143 or 121 RBs for normal or extended cyclic prefix, e.g.:

In the time domain, an S-SS/PSBCH block consists of $N_{symb}^{S-SSB}$ OFDM symbols.

The number of OFDM symbols in an S-SS/PSBCH block $N_{symb}^{S-SSB}=13$ for normal cyclic prefix and $N_{symb}^{S-SSB}=11$ for extended cyclic prefix. (An SS/PBCH block on Uu interface consists of 4 OFDM symbols).

In the frequency domain, an S-SS/PSBCH block consists of 132 contiguous subcarriers with the subcarriers numbered in increasing order from 0 to 131 within the sidelink S-SS/PSBCH block.

The short PRACH preamble on Uu interface occupies 6 or 12 RBs for 60 kHz or 120 kHz subcarrier spacing (assuming 120 kHz PUSCH).

Referring to FIG. 7, in some designs, the sidelink discovery message may include, e.g.:

ProSe Application ID, indicates what the UE is interested to announce.

UE Identity, IMSI (15 digits).

Announce command.

Application ID, represents a unique identifier of the UE application that has triggered the transmission of the Discovery Request message.

Discovery Entry ID, indicates whether this is a new request.

Requested Timer, optional, indicates the length of validity timer associated with the ProSe Application Code.

Application-Level Container, optional, contains the request and any relevant information for the ProSe Application Server to assign a (set of) ProSe Application Code Suffix(es).

PC5_tech, optional, indicates the PC5 radio technology (e.g. E-UTRA, WLAN) that UE wishes to use for announcements.

Referring to FIG. 7, in some designs, the sidelink discovery response message may include (assuming code rate 2/3, 64QAM, 25% REs for DMRS, discovery request and response messages occupy 5 and 2 RBs respectively), e.g.:

ProSe Application Code, corresponds to the ProSe Application ID that was contained in the Discovery Request (184 bits).

Validity timer, indicates for how long this ProSe Application Code is going to be valid.

Discovery Entry ID, indicates whether this is a new request.

PC5 tech, optional, indicates the PC5 radio technology (ies) that is/are authorized to be used for the assigned ProSe Application Code.

Referring to FIG. 7, beam training can be based on either BTRS (as shown in FIG. 7) or DMRS. In some designs, the sidelink discovery message may be transmitted with wider beams while BTRS is transmitted with narrower beams, in which case there is a 1-to-N mapping between sidelink discovery beams and BTRS beams, as shown in FIG. 8A.

Figure 8A:
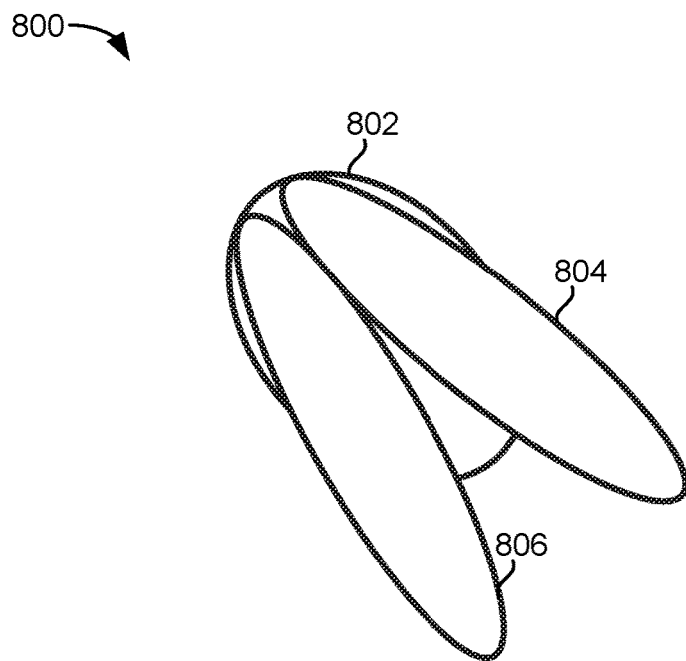
FIG. 8A illustrates a comparative illustration depicting the relative widths of beams in accordance with aspects of the disclosure.
Figure 8B:
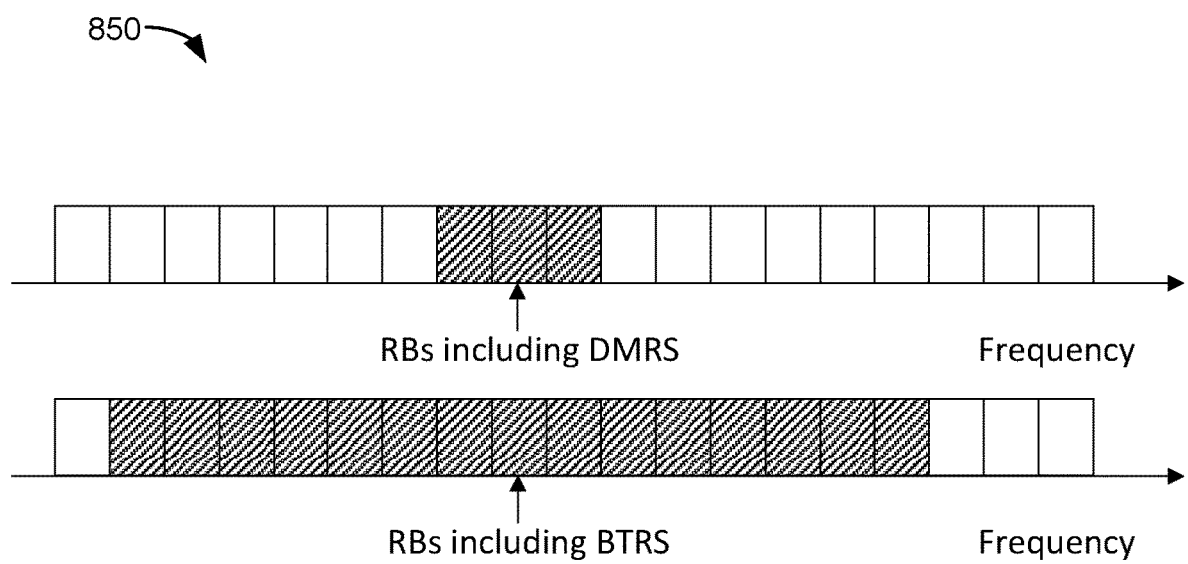
FIG. 8B illustrates frequency utilizations of BTRS and DMRS in accordance with aspects of the disclosure.

FIG. 8A illustrates a comparative illustration 800 depicting the relative widths of beams in accordance with aspects of the disclosure. In FIG. 8A, a wider beam 802 may be used for transmission of the sidelink discovery message, and narrower beams 804 and 806 may be used for transmission of BTRS. In this case, there is a 1:2 correspondence between sidelink discovery beams and BTRS beams (i.e., a 1:N correspondence where N=2). With reference to FIG. 7, in some designs, the BTRS is made narrower so that UE 2 may select a narrower beam (beam refinement). FIG. 8B illustrates frequency utilizations 850 of BTRS and DMRS in accordance with aspects of the disclosure. As shown in FIG. 8B, BTRS occupies wider bandwidth than DMRS (e.g., BTRS provides RSRP across a wider bandwidth than DMRS).

Sidelink communication may be implemented over higher bands (e.g., FR2, FR2x, FR4), which may complicate the discovery process. As noted above, UEs on sidelink need to discovery each other to setup a connection. In some designs, UEs need to perform beam training during the discovery procedure, as described above with respect to FIG. 7. In some designs, without beam training, it is difficult for UEs to communicate the sidelink discovery messages and sidelink discovery response messages. In FIG. 7, beam training is performed before the sidelink discovery message is communicated. Hence, all candidate responder UEs that detect BTRS may transmit the BT response (e.g., because the candidate responder UEs do not yet know if they are interested in connecting to the initiator UE). This creates high system overhead in scenarios where candidate responder UEs perform beam training and transmit BT responses, but ultimately receive the sidelink discovery message and decide not to connect (e.g., no sidelink discovery response message is sent).

Aspects of the disclosure are directed to a discovery procedure whereby an initiator UE transmits sidelink discovery message(s) and BTRS(s) before a BT response is received from candidate responder UEs. In this case, the candidate responder UEs have an opportunity to review the sidelink discovery message(s) before transmission of a BT response. Such aspects may provide various technical advantages, such as reducing discovery overhead, reducing spectral interference, and so on.

Figure 9:
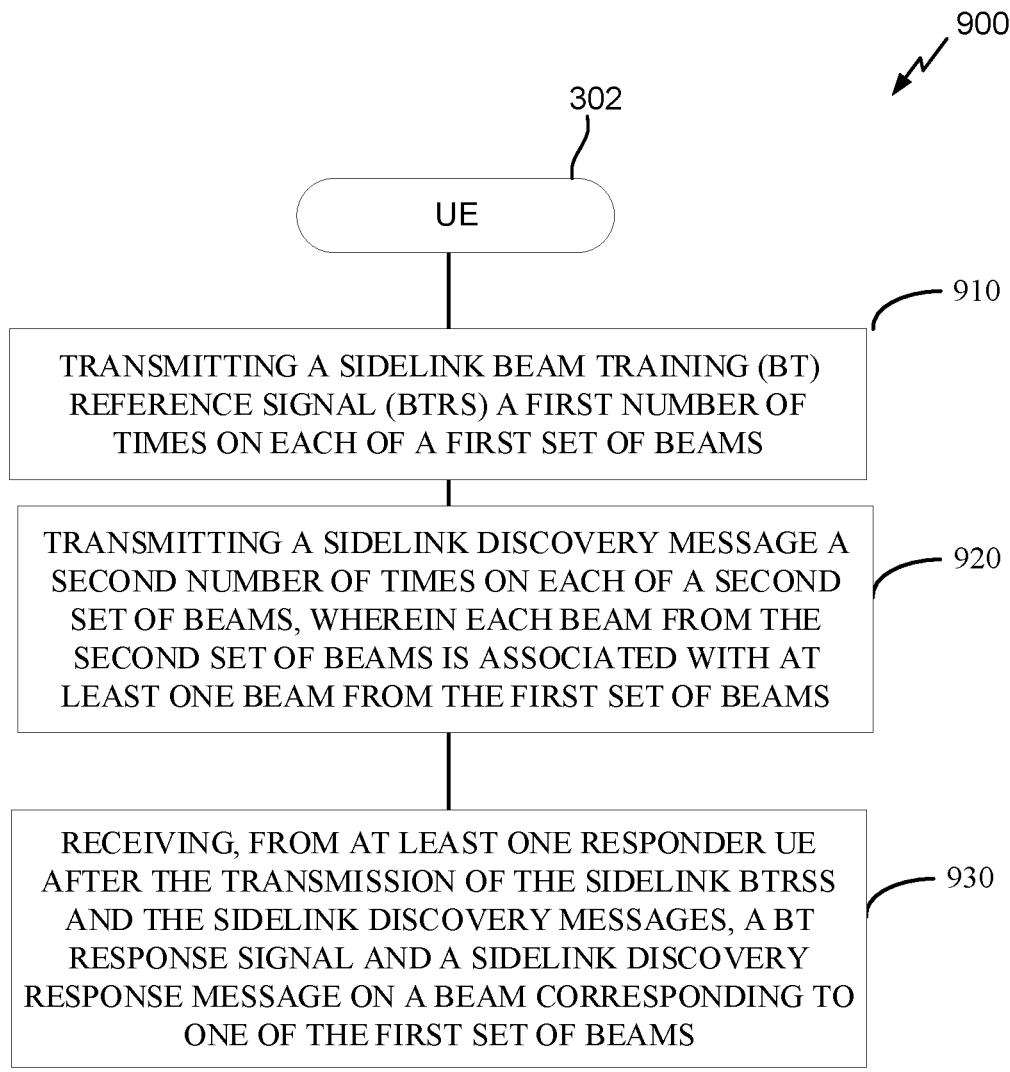
FIG. 9 illustrates an exemplary process of communications according to an aspect of the disclosure.

FIG. 9 illustrates an exemplary process 900 of communications according to an aspect of the disclosure. The process 900 of FIG. 9 is performed by a UE, which may correspond to UE 302 as an example.

Referring to FIG. 9, at 910, the initiator UE (e.g., transmitter 314 or 324, etc.) transmits a sidelink BTRS a first number of times on each of a first set of beams. Below, the first number of times (or BTRS repetition number) is denoted as M and the number of beams in the first set of beams is denoted as N (or $N_{BTRS}$). In some designs, the transmission of the sidelink BTRSs may be implemented via a "beam sweeping" technique, as described above. In some designs, the sidelink BTRSs are transmitted (e.g., via beam sweeping) in order between successively adjacent beams among the first set of beams. In other designs, the sidelink BTRSs are transmitted via interleaving of the first set of beams (e.g., in other words, the sequence of beams over which the beam sweeping of the sidelink BTRSs is implemented may be disordered, as described below in more detail).

Referring to FIG. 9, at 920, the initiator UE (e.g., transmitter 314 or 324, etc.) transmits a sidelink discovery message a second number of times on each of a second set of beams, wherein each beam from the second set of beams is associated with at least one beam from the first set of beams. Below, the number of beams in the first set of beams is denoted as N (or $N_{disc}$). The second number of times may be the same or different than the first number of times (M). In some designs, each beam from the second set of beams may spatially overlap with some or all of one (or more) beam from the first set of beams (e.g., 1:1 or N:1 mapping between the first set of beams and the second set of beams, with N being greater than 1), as described below in more detail). In some designs, the transmission of the sidelink discovery messages at 920 follows the transmission of the sidelink BTRSs at 910. In other designs, the transmission of the sidelink BTRSs at 910 follows the transmission of the sidelink discovery messages at 920. In some designs, the transmission of the sidelink discovery messages may be implemented via a "beam sweeping" technique, as described above. In some designs, the sidelink discovery messages are transmitted (e.g., via beam sweeping) in order between successively adjacent beams among the first set of beams. In other designs, the sidelink discovery messages are transmitted via interleaving of the first set of beams (e.g., in other words, the sequence of beams over which the beam sweeping of the sidelink discovery messages is implemented may be disordered, as described below in more detail).

Referring to FIG. 9, at 930, the initiator UE (e.g., receiver 312 or 322, etc.) receives, from at least one responder UE after the transmission of the sidelink BTRSs and the sidelink discovery messages, a BT response signal and a sidelink discovery response message on a beam corresponding to (e.g., having beam reciprocity with respect to) one of the first set of beams. In some designs, the BT response signal may include a preamble (e.g., similar to CSI-RS and separate from PSCCH/PSSCH). In other designs, the BT response signal may include a message (e.g., a sidelink discovery response message). For example, the message may be received as part of PSCCH/PSSCH.

Figure 10:
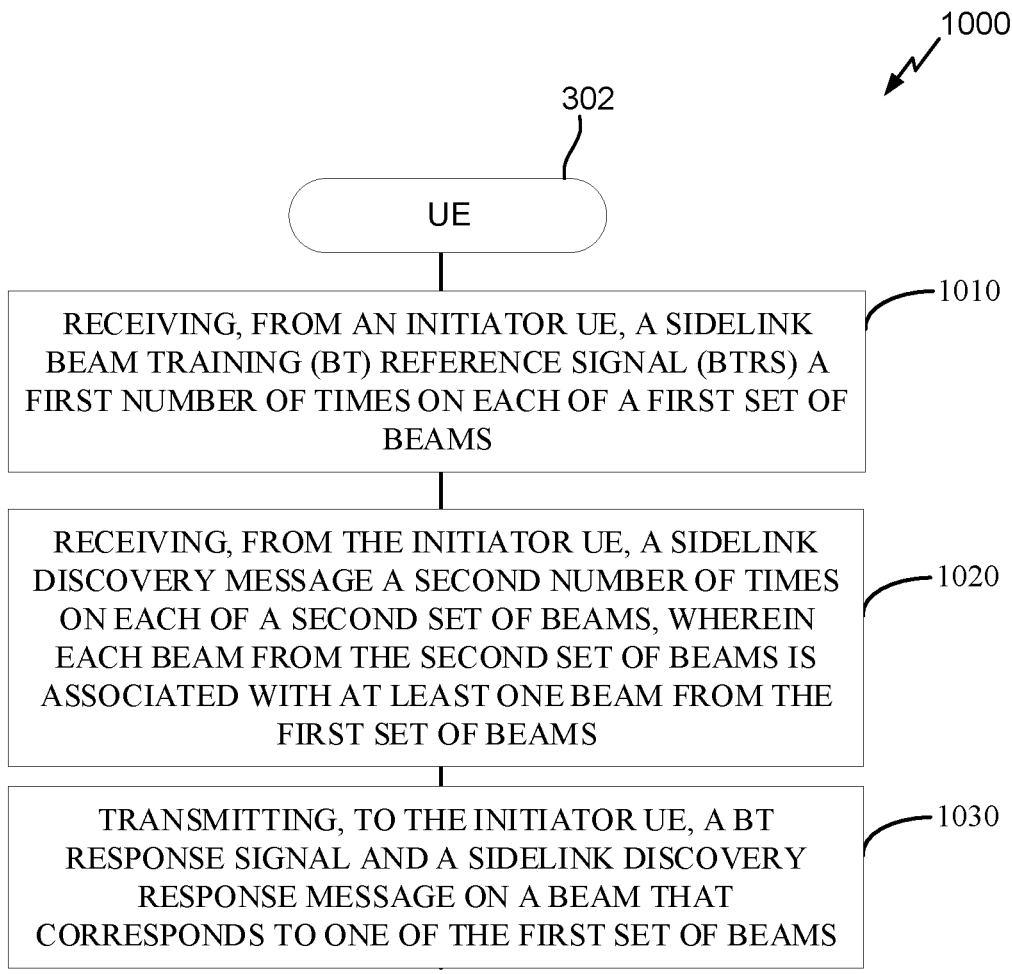
FIG. 10 illustrates an exemplary process of communications according to an aspect of the disclosure.

FIG. 10 illustrates an exemplary process 1000 of communications according to an aspect of the disclosure. The process 1000 of FIG. 10 is performed by a UE, which may correspond to UE 302 as an example.

Referring to FIG. 10, at 1010, the responder UE (e.g., receiver 312 or 322, etc.) receives, from an initiator UE, a sidelink BTRS a first number of times on each of a first set of beams. Below, the first number of times (or BTRS repetition number) is denoted as M and the number of beams in the first set of beams is denoted as N (or $N_{BTRS}$). In some designs, the reception of the sidelink BTRSs may be implemented via a "beam sweeping" technique, as described above. In some designs, the sidelink BTRSs are received (e.g., via beam sweeping) in order between successively adjacent beams among the first set of beams. In other designs, the sidelink BTRSs are received via interleaving of the first set of beams (e.g., in other words, the sequence of beams over which the beam sweeping of the sidelink BTRSs is implemented may be disordered, as described below in more detail).

Referring to FIG. 10, at 1020, the responder UE (e.g., receiver 312 or 322, etc.) receives, from the initiator UE, a sidelink discovery message a second number of times on each of a second set of beams, wherein each beam from the second set of beams is associated with at least one beam from the first set of beams. Below, the number of beams in the first set of beams is denoted as N (or $N_{disc}$). The second number of times (or sidelink discovery message repetition number) may be the same or different than the first number of times. In some designs, each beam from the second set of beams may spatially overlap with some or all of one (or more) beam from the first set of beams (e.g., 1:1 or N:1 mapping between the first set of beams and the second set of beams, with N being greater than 1), as described below in more detail). In some designs, the reception of the sidelink discovery messages at 1020 follows the reception of the sidelink BTRSs at 1010. In other designs, the reception of the sidelink BTRSs at 1010 follows the reception of the sidelink discovery messages at 1020. In some designs, the reception of the sidelink discovery messages may be implemented via a "beam sweeping" technique, as described above. In some designs, the sidelink discovery messages are received (e.g., via beam sweeping) in order between successively adjacent beams among the first set of beams. In other designs, the sidelink discovery messages are transmitted via interleaving of the first set of beams (e.g., in other words, the sequence of beams over which the beam sweeping of the sidelink discovery messages is implemented may be disordered, as described below in more detail).

Referring to FIG. 10, at 1030, the responder UE (e.g., transmitter 314 or 324, etc.) transmits, to the initiator UE, a BT response signal and a sidelink discovery response message on a beam that corresponds to (e.g., has beam reciprocity with respect to) one of the first set of beams. In some designs, the BT response signal may include a preamble (e.g., similar to CSI-RS and separate from PSCCH/PSSCH). In other designs, the BT response signal may include a message (e.g., a sidelink discovery response message). For example, the message may be received as part of PSCCH/PSSCH.

Referring to FIGS. 9-10, in some designs as noted above, each beam among the first set of beams is associated with a first width, and each beam among the second set of beams is associated with a second width that is wider than the first width. One example of such an implementation is described above with respect to FIG. 8A, where a wider beam 802 may be used for transmission of the sidelink discovery message, and narrower beams 804 and 806 may be used for transmission of BTRS. In this case, there is a N:1 mapping between the first set of beams and the second set of beams, with N being greater than 1. In some designs, two or more beams among the first set of beams correspond to a single beam among the second set of beams (e.g., N>=2). In other designs, each beam among the first set of beams is associated with the same width as each beam among the second set of beams. In this case, there is a 1:1 mapping between the first set of beams and the second set of beams.

Figure 11:
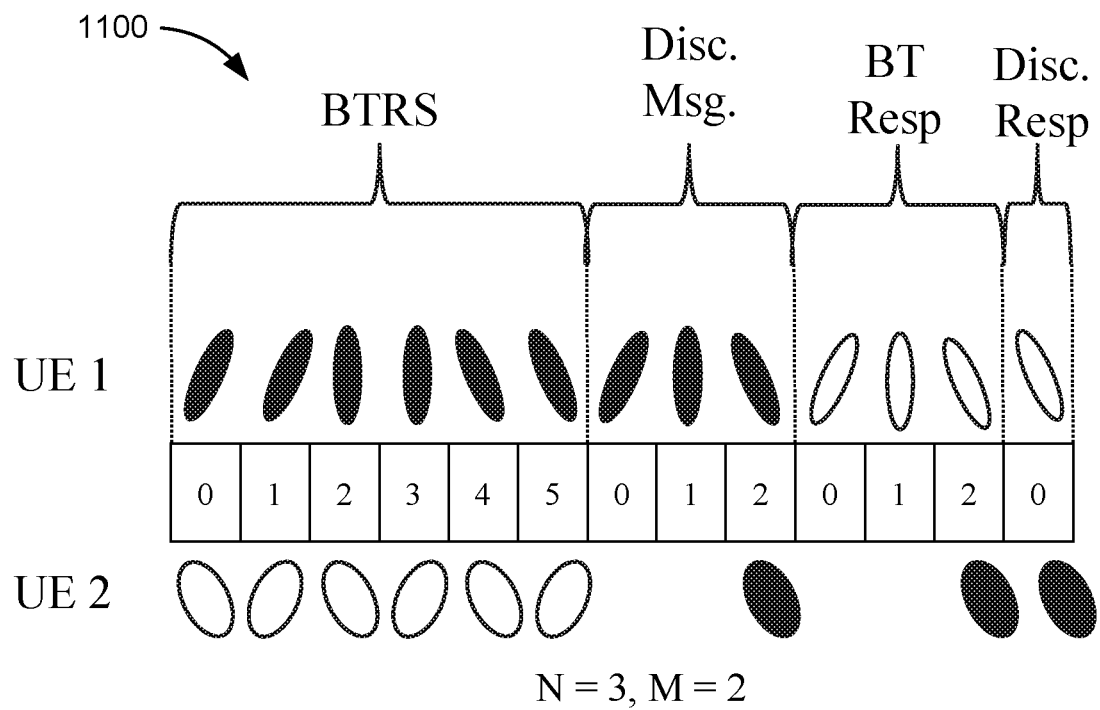
FIG. 11 illustrates a discovery procedure based on an example implementation of the processes of FIGS. 9-10 in accordance with aspects of the disclosure.
Figure 12:
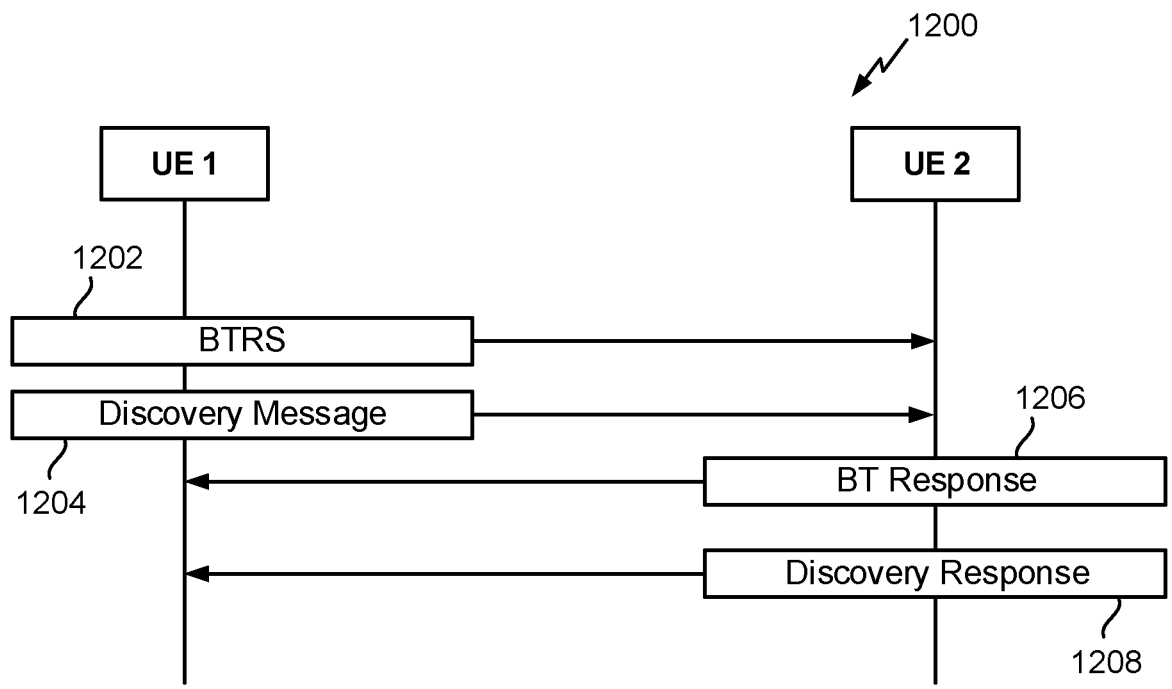
FIG. 12 illustrates a signaling sequence associated with the discovery procedure of FIG. 11.

FIG. 11 illustrates a discovery procedure 1100 based on an example implementation of the processes 900-1000 of FIGS. 9-10 in accordance with aspects of the disclosure. FIG. 12 illustrates a signaling sequence 1200 associated with the discovery procedure 1100 of FIG. 11.

Referring to FIGS. 11-12, similar to FIG. 7, at 1202, UE 1 transmits BTRS upon N transmit beams (N=3) with M repetitions (M=2) per beam across 6 total slots (M×N=2× 3=6). In some designs, M=2 may be based on an expectation that the candidate responder UEs (e.g., UE 2) are monitoring for sidelink discovery messages on two receive beams (e.g., alternating between the respective receive beams). In other words, repeating BTRS M times will ensure that a responder UE with M receive beams will have a chance to detect BTRS on each of its receive beams. UE 2 receives the beam sweeping of BTRS on some or all of the N beams and selects the beam among UE 2's M beams with correspondence to the best BTRS beam (i.e., the selected beam is now paired with the best BTRS beam).

Referring to FIGS. 11-12, unlike FIG. 7, UE 2 does not automatically respond to the BTRS with a BT response signal. Instead, at 1204, UE 1 further transmits the sidelink discovery message on the N transmit beams (e.g., in this case, with a single repetition per beam as shown in FIG. 11). Because UE 2 receives the sidelink discovery message before a BT response signal is sent by UE 2, UE 2 can analyze the sidelink discovery message and determine whether or not to respond to the sidelink discovery message (e.g., so in some cases, some responder UEs may decode the sidelink discovery message and then opt not to respond with a BT response signal or sidelink discovery response message). At 1206, assume that UE 2 decides to respond to the sidelink discovery message from 1204, and thereby transmits a BT response signal 1206 and a sidelink discovery response message at 1208. Hence, at least some candidate responder UEs may read the sidelink discovery message and opt not to respond with a BT response signal, which reduces interference and overhead in the system.

Figure 13:
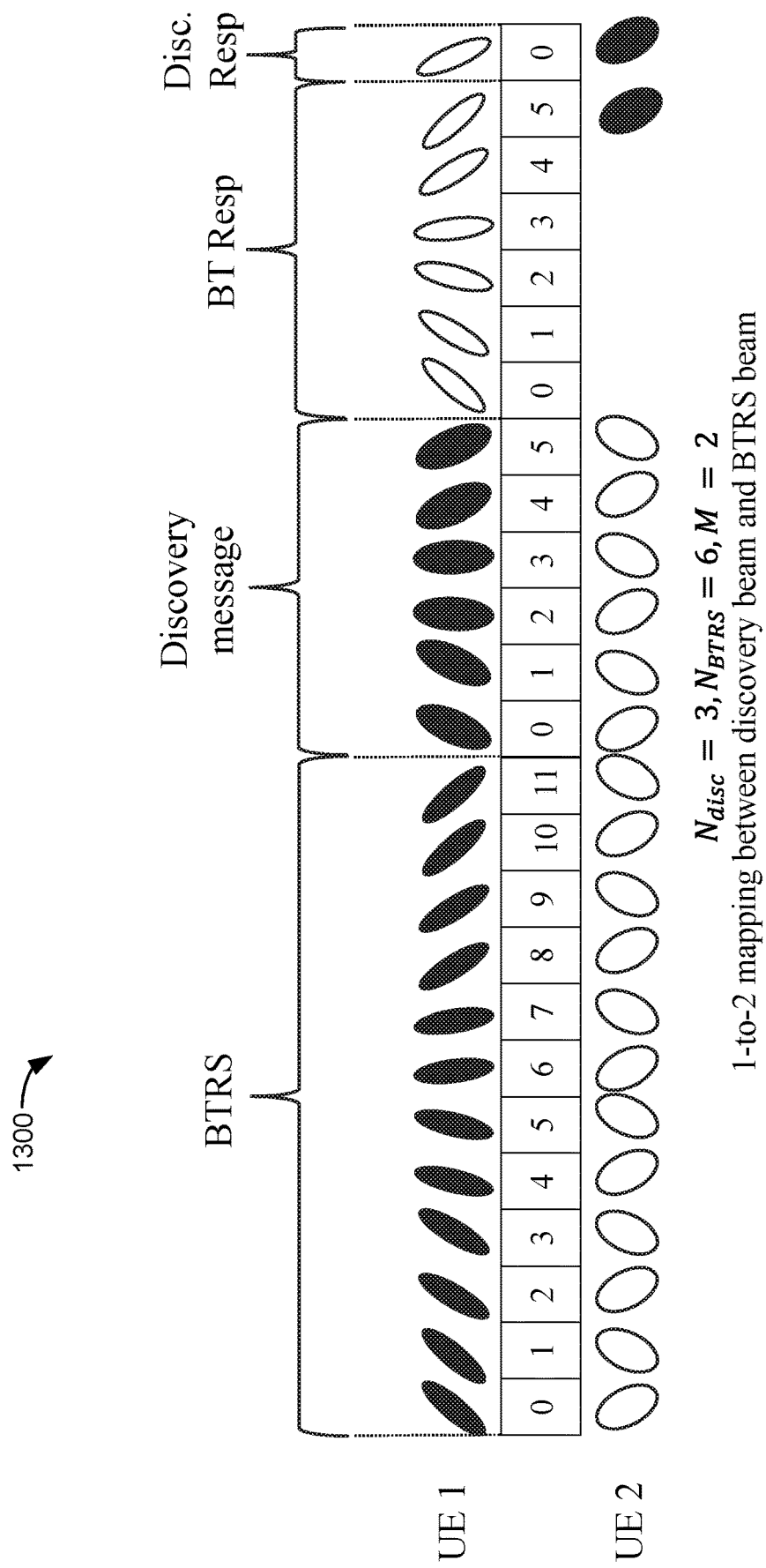
FIG. 13 illustrates a discovery procedure based on an example implementation of the processes of FIGS. 9-10 in accordance with aspects of the disclosure.

FIG. 13 illustrates a discovery procedure 1300 based on an example implementation of the processes 900-1000 of FIGS. 9-10 in accordance with aspects of the disclosure. Similar to FIG. 11, the discovery procedure 1300 may also be associated with the signaling sequence 1200 of FIG. 12. In FIG. 13, the sidelink discovery message is transmitted via wider beams 802 as depicted in FIG. 8A, and the BTRS is transmitted via narrower beams 804-806 as depicted in FIG. 8A. In particular, there is an N:1 mapping between BTRS beams and sidelink discovery beams, where N=2 or 2:1 mapping. In some designs, using narrower beam widths for BTRS may help to reduce or avoid further beam refinement after a connection is established between the initiator UE and the responder UE. Hence, $N_{disc}=3$ and $N_{BTRS}=6$. In FIG. 13, the BTRS and discovery messages transmitted via "ordered" beam sweeping. In other words, the sidelink BTRSs are transmitted in order between successively adjacent beams among the first set of beams, and the sidelink discovery messages are also transmitted in order between successively adjacent beams among the second set of beams. The discovery procedure 1300 of FIG. 13 is otherwise the same as the discovery procedure 1100 of FIG. 11, and as such will not be discussed further for the sake of brevity.

Figure 14:
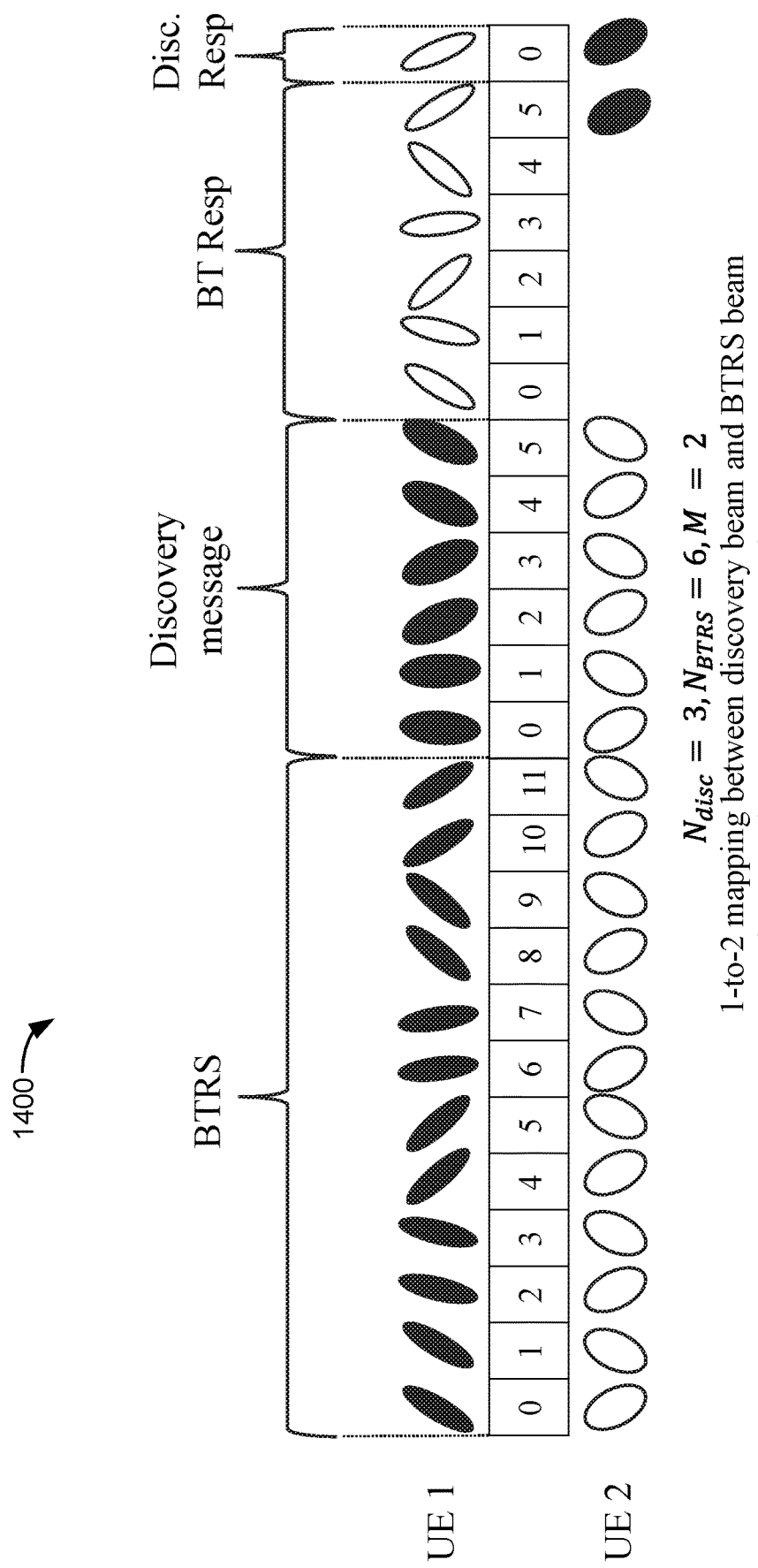
FIG. 14 illustrates a discovery procedure based on an example implementation of the processes of FIGS. 9-10 in accordance with aspects of the disclosure.

FIG. 14 illustrates a discovery procedure 1400 based on an example implementation of the processes 900-1000 of FIGS. 9-10 in accordance with aspects of the disclosure. Similar to FIG. 11, the discovery procedure 1400 may also be associated with the signaling sequence 1200 of FIG. 12. In FIG. 14, the sidelink discovery message is transmitted via wider beams 802 as depicted in FIG. 8A, and the BTRS is transmitted via narrower beams 804-806 as depicted in FIG. 8A. In particular, there is an N:1 mapping between BTRS beams and sidelink discovery beams, where N=2 or 2:1 mapping. Hence, $N_{disc}=3$ and $N_{BTRS}=6$. Unlike FIG. 13 where the BTRS and discovery messages transmitted via "ordered" beam sweeping, in FIG. 14 the BTRS and discovery messages are transmitted via interleaved (or "unordered") beam sweeping. More specifically, instead of transmitting BTRS beams $\{0, 1, \ldots, N_{BTRS}-1\}$ in order, the BTRS beams are disordered before transmission, e.g., $\{3, 0, N_{BTRS}-1, \ldots, 6\}$. In some designs, interleaving order of the BTRS beams and the BT response is preconfigured, which is known to all UEs. In some designs, interleaved or unordered beam sweeping may reduce or avoid an influence of temporary blocking on measurement (e.g., sometimes, a temporary block may reduce measurement quality on an otherwise good beam pair). The discovery procedure 1400 of FIG. 14 is otherwise the same as the discovery procedure 1300 of FIG. 13, and as such will not be discussed further for the sake of brevity.

Referring to FIGS. 9-14, assuming that $N_{BTRS}=N_{disc}$, the overhead is N×M×BTRS+N×DISC+N×V×BT_Resp+V× DISC_Resp, where N is the number of Tx beams, M is the number of Rx beams, V is the number of responder UEs, and BTRS, BT_Resp, DISC and DISC_Resp are the overhead of beam training reference signal, beam training response preamble, discovery message and discovery response message, respectively. Under these assumptions, in some designs:

Assuming V≤N, and there is no collision between UEs.
N×M×BTRS because UE 1 repeats BTRS N_BTRS×M times.
N×DISC because UE 2 knows the optimal Rx beam, so UE 1 only repeats discovery message N_disc times.
N×V×BT_Resp because only the target UEs need to respond to UE 1, and UE 1 receives the response from all directions.
V×DISC_Resp because the beam pair between UE 1 and UE 2 has been established, the discovery response does not require beam sweeping.
If V>N, or collision between BT response, UE 1 may repeat BTRS and sidelink discovery transmission multiple times to receive more responses.

While FIGS. 11-14 relate to scenarios where transmission of the sidelink discovery message follows transmission of the BTRS, in other designs, transmission BTRS of the follows transmission of the sidelink discovery message. Such aspects are described below with respect to FIGS. 15-18. Generally, for scenarios where the sidelink discovery message follows transmission of the BTRS as in FIGS. 11-14, the sidelink discovery message can be transmitted using the beam pair established via BTRS (e.g., good for delivery of sidelink discovery message). For scenarios where the sidelink discovery message precedes transmission of the BTRS as in FIGS. 15-18, UEs that choose not to respond to the originating UE may skip the BTRS (e.g., good for power saving).

Figure 15:
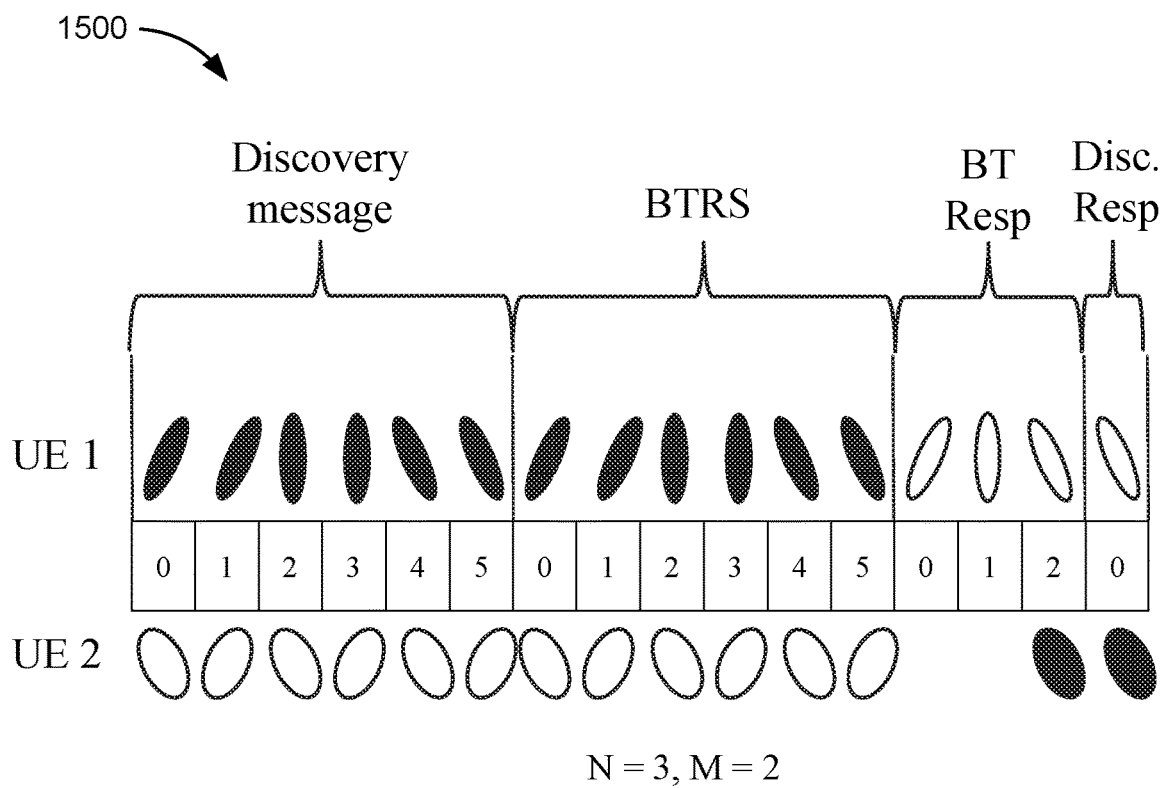
FIG. 15 illustrates a discovery procedure based on an example implementation of the processes of FIGS. 9-10 in accordance with aspects of the disclosure.
Figure 16:
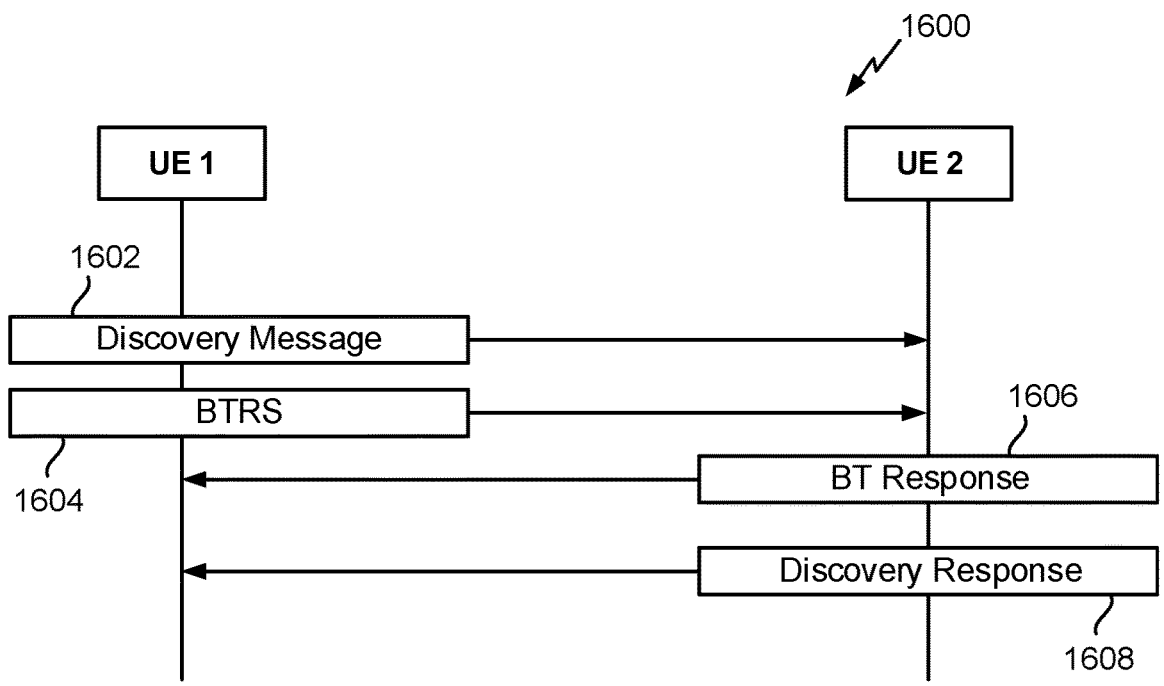
FIG. 16 illustrates a signaling sequence associated with the discovery procedure of FIG. 15.

FIG. 15 illustrates a discovery procedure 1500 based on an example implementation of the processes 900-1000 of FIGS. 9-10 in accordance with aspects of the disclosure. FIG. 16 illustrates a signaling sequence 1600 associated with the discovery procedure 1500 of FIG. 15.

Referring to FIGS. 15-16, at 1602, UE 1 transmits the sidelink discovery message on the N (N=3) transmit beams (e.g., in this case, with two repetitions per beam as shown in FIG. 15). At 1604, UE 1 transmits BTRS upon N transmit beams (N=3) with M repetitions (M=2) per beam across 6 total slots (M×N=2×3=6). In some designs, M=2 may be based on an expectation that the candidate responder UEs (e.g., UE 2) are monitoring for sidelink discovery messages on two receive beams (e.g., alternating between the respective receive beams). In other words, repeating BTRS M times will ensure that a responder UE with M receive beams will have a chance to detect BTRS on each of its receive beams. UE 2 receives the beam sweeping of BTRS on some or all of the N beams and selects the beam among UE 2's M beams with correspondence to the best BTRS beam (i.e., the selected beam is now paired with the best BTRS beam).

Referring to FIGS. 15-16, unlike FIG. 7, UE 2 does not automatically respond to the BTRS with a BT response signal. Instead, because UE 2 receives the sidelink discovery message before a BT response signal is sent by UE 2, UE 2 can analyze the sidelink discovery message and determine whether or not to respond to the sidelink discovery message (e.g., so in some cases, some responder UEs may decode the sidelink discovery message and then opt not to respond with a BT response signal or sidelink discovery response message). At 1606, assume that UE 2 decides to respond to the sidelink discovery message from 1602, and thereby transmits a BT response signal 1606 and a sidelink discovery response message at 1608. Hence, at least some candidate responder UEs may read the sidelink discovery message and opt not to respond with a BT response signal, which reduces interference and overhead in the system.

Figure 17:
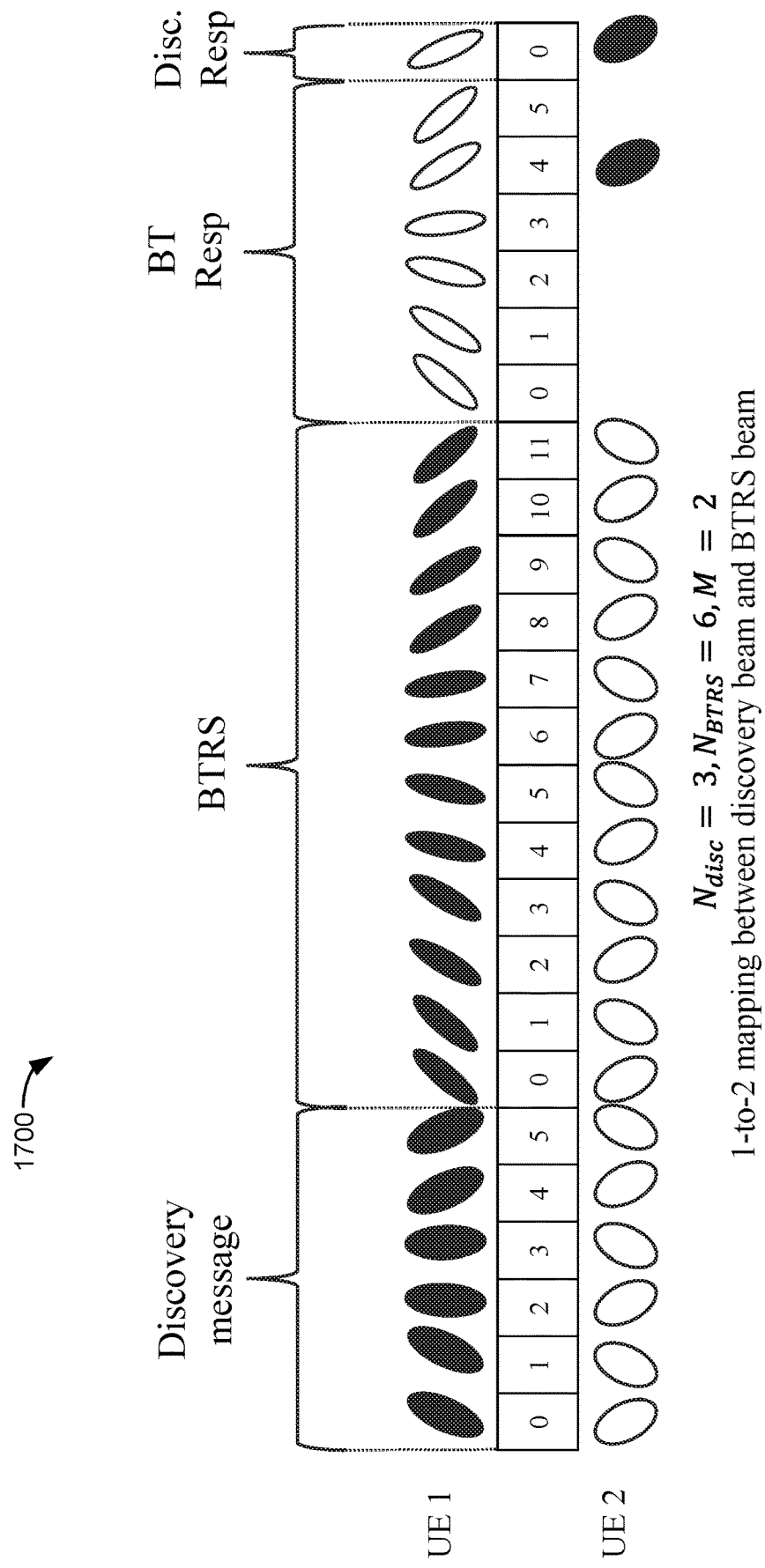
FIG. 17 illustrates a discovery procedure based on an example implementation of the processes of FIGS. 9-10 in accordance with aspects of the disclosure.

FIG. 17 illustrates a discovery procedure 1700 based on an example implementation of the processes 900-1000 of FIGS. 9-10 in accordance with aspects of the disclosure. Similar to FIG. 15, the discovery procedure 1700 may also be associated with the signaling sequence 1600 of FIG. 16. In FIG. 17, the sidelink discovery message is transmitted via wider beams 802 as depicted in FIG. 8A, and the BTRS is transmitted via narrower beams 804-806 as depicted in FIG. 8A. In particular, there is an N:1 mapping between BTRS beams and sidelink discovery beams, where N=2 or 2:1 mapping. In some designs, using narrower beam widths for BTRS may help to reduce or avoid further beam refinement after a connection is established between the initiator UE and the responder UE. Hence, $N_{disc}$=3 and $N_{BTRS}$=6. In FIG. 17, the BTRS and discovery messages transmitted via "ordered" beam sweeping. In other words, the sidelink BTRSs are transmitted in order between successively adjacent beams among the first set of beams, and the sidelink discovery messages are also transmitted in order between successively adjacent beams among the second set of beams. The discovery procedure 1700 of FIG. 17 is otherwise the same as the discovery procedure 1500 of FIG. 15, and as such will not be discussed further for the sake of brevity.

Figure 18:
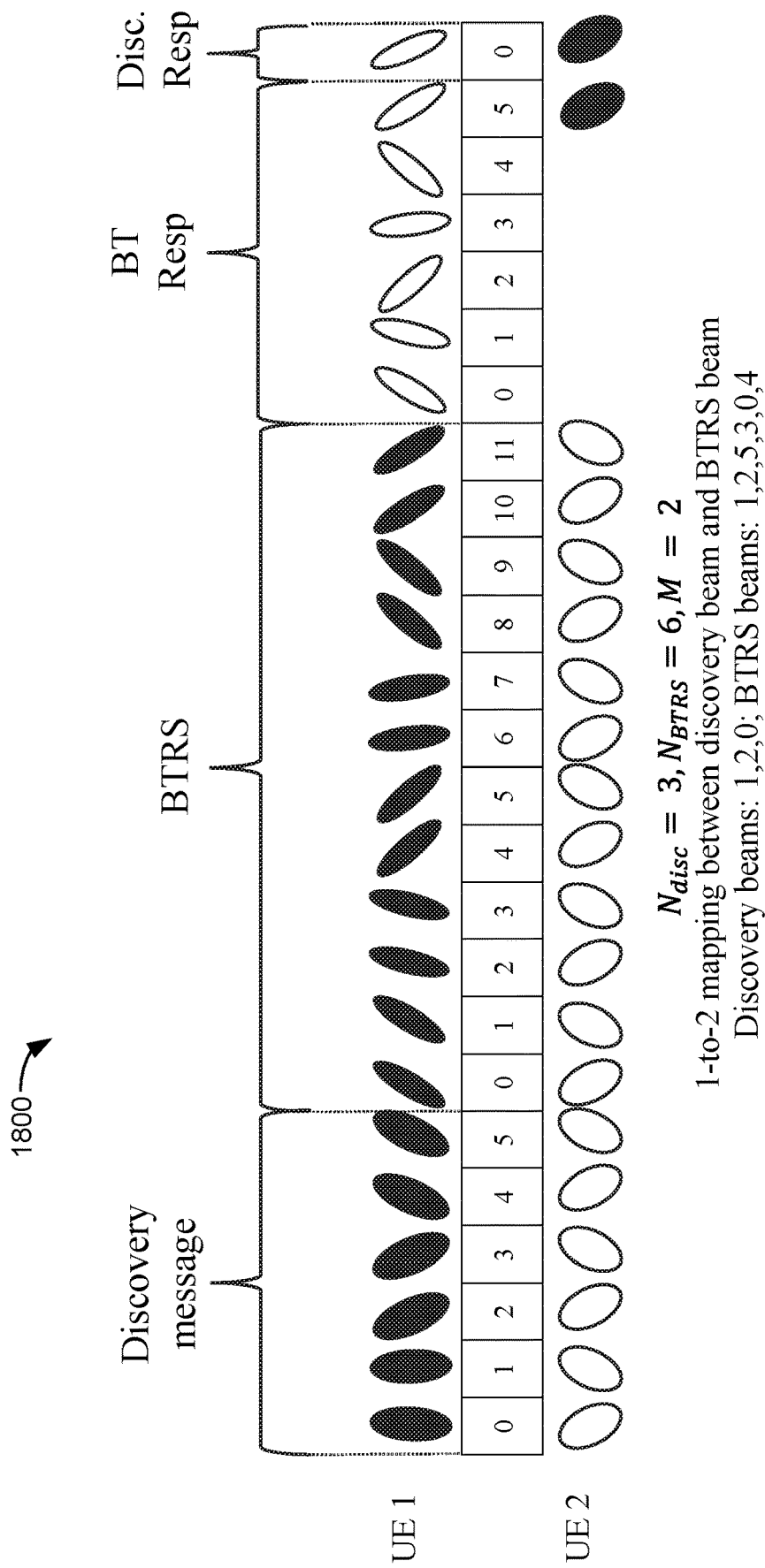
FIG. 18 illustrates a discovery procedure based on an example implementation of the processes of FIGS. 9-10 in accordance with aspects of the disclosure.

FIG. 18 illustrates a discovery procedure 1800 based on an example implementation of the processes 900-1000 of FIGS. 9-10 in accordance with aspects of the disclosure.

Similar to FIG. 15, the discovery procedure 1800 may also be associated with the signaling sequence 1600 of FIG. 16. In FIG. 18, the sidelink discovery message is transmitted via wider beams 802 as depicted in FIG. 8A, and the BTRS is transmitted via narrower beams 804-806 as depicted in FIG. 8A. In particular, there is an N:1 mapping between BTRS beams and sidelink discovery beams, where N=2 or 2:1 mapping. Hence, $N_{disc}$=3 and $N_{BTRS}$=6. Unlike FIG. 17 where the BTRS and discovery messages transmitted via "ordered" beam sweeping, in FIG. 18 the BTRS and discovery messages are transmitted via interleaved (or "unordered") beam sweeping. More specifically, instead of transmitting BTRS beams $\{0, 1, \ldots, N_{BTRS}-1\}$ in order, the BTRS beams are disordered before transmission, e.g., $\{3, 0, N_{BTRS}-1, \ldots, 6\}$. In some designs, interleaving order of the BTRS beams and the BT response is preconfigured, which is known to all UEs. In some designs, interleaved or unordered beam sweeping may reduce or avoid an influence of temporary blocking on measurement (e.g., sometimes, a temporary block may reduce measurement quality on an otherwise good beam pair). The discovery procedure 1800 of FIG. 18 is otherwise the same as the discovery procedure 1700 of FIG. 17, and as such will not be discussed further for the sake of brevity.

Referring to FIGS. 15-18, assuming that $N_{BTRS}=N_{disc}$, the total RBs occupied is N×M×(BTRS+DISC)+N×V× BT_Resp+V×DISC_Resp, where N is the number of Tx beams, M is the number of Rx beams, V is the number of responder UEs, and BTRS, BT_Resp, DISC and DISC_Resp are the RBs of beam training reference signal, beam training response preamble, discovery message and discovery response message, respectively. Under these assumptions, in some designs:

N×M×(BTRS+DISC) because UE 1 repeats BTRS and discovery message N×M times

N×V×BT_Resp because only the target UEs need to respond to UE 1, and UE 1 receives the response from all directions V×DISC_Resp because the beam pair between UE 1 and UE 2 has been established, the discovery response does not require beam sweeping In some designs, the discovery procedure 700 of FIG. 7 is generally associated with higher overhead as compared to any of the disclosure procedures described with respect to FIGS. 9-18. However, the discovery procedure 700 of FIG. 7 is also in more reliable, because a beam pair is established before the sidelink discovery message is transmitted. In some designs, the discovery procedures described between FIGS. 15-18 may grant some responder UEs an opportunity to skip beam training (i.e., BTRS reception altogether). For example, if UE 2 is capable of decoding the sidelink discovery message in FIGS. 15-18 and determines that it is not interested in responding, then performing the subsequent beam training via BTRS can be skipped (e.g., in contrast to FIGS. 11-14, where the BTRS is transmitted first).

Figure 19:
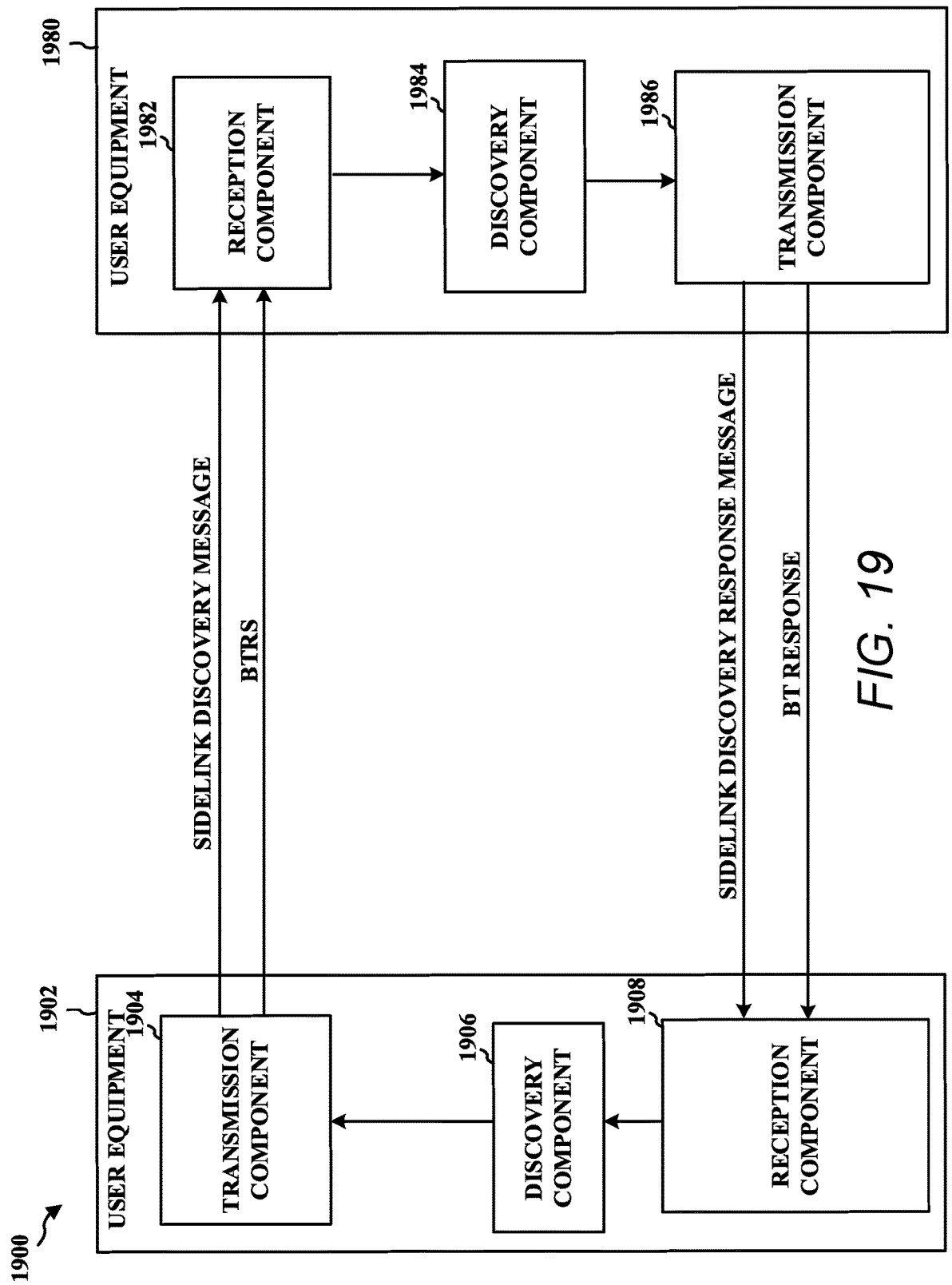
FIG. 19 is a conceptual data flow diagram illustrating the data flow between different means/components in exemplary apparatuses in accordance with an aspect of the disclosure.

FIG. 19 is a conceptual data flow diagram 1900 illustrating the data flow between different means/components in exemplary apparatuses 1902 and 1980 in accordance with an aspect of the disclosure. The apparatus 1902 may be an initiator UE (e.g., UE 302) in communication with an apparatus 1980, which may be a responder UE (e.g., UE 302).

The apparatus 1902 includes a transmission component 1904, which may correspond to transmitter circuitry in UE 302 as depicted in FIG. 3A, including transmitter(s) 314 and 324, antenna(s) 316 and 326, etc. The apparatus 1902 further includes Discovery component 1906, which may correspond to processor circuitry in UE 302 as depicted in FIG. 3A, including processing system 332, etc. The apparatus 1902 further includes a reception component 1908, which may correspond to receiver circuitry in UE 302 as depicted in FIG. 3A, including receiver(s) 312 and 322, antenna(s) 316 and 326, etc.

The apparatus 1980 includes a transmission component 1986, which may correspond to transmitter circuitry in UE 302 as depicted in FIG. 3A, including transmitter(s) 314 and 324, antenna(s) 316 and 326, etc. The apparatus 1980 further includes Discovery component 1984, which may correspond to processor circuitry in UE 302 as depicted in FIG. 3A, including processing system 332, etc. The apparatus 1980 further includes a reception component 1982, which may correspond to receiver circuitry in UE 302 as depicted in FIG. 3A, including receiver(s) 312 and 322, antenna(s) 316 and 326, etc.

Referring to FIG. 19, the discovery component 1906 directs the transmission component 1904 transmits sidelink discovery message and BTRS on multiple beams and repetition(s) (in either order, as described above). The reception component 1982 receives the sidelink discovery message and BTRS, and the discovery component 1984 decides to respond to the sidelink discovery message. The discovery component 1984 directs the transmission component 1986 to transmit a BT response and a sidelink discovery response message to the reception component 1908.

One or more components of the apparatus 1902 and apparatus 1980 may perform each of the blocks of the algorithm in the aforementioned flowcharts of FIGS. 9-10. As such, each block in the aforementioned flowcharts of FIGS. 9-10 may be performed by a component and the apparatus 1902 and apparatus 1980 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
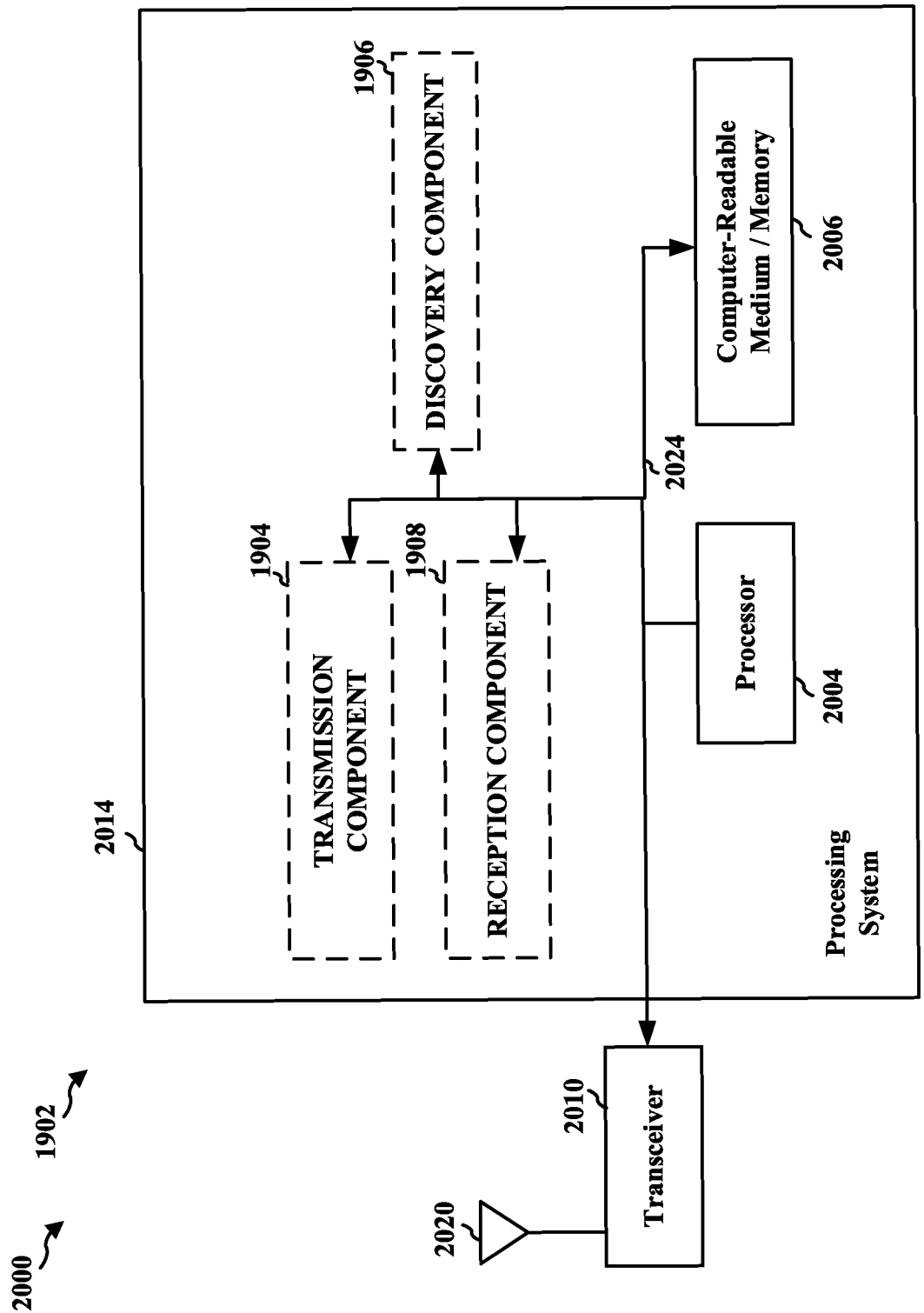
FIGS. 20-21 are diagrams illustrating examples of hardware implementations for apparatuses employing processing systems in accordance with aspects of the disclosure.

FIG. 20 is a diagram 2000 illustrating an example of a hardware implementation for an apparatus 1902 employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906 and 1908, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1908. In addition, the transceiver 2010 receives information from the processing system 2014, specifically the transmission component 1904, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906 and 1908. The components may be software components running in the processor 2004, resident/stored in the computer readable medium/memory 2006, one or more hardware components coupled to the processor 2004, or some combination thereof.

In one configuration, the apparatus 1902 (e.g., a UE) for wireless communication includes means for transmitting a sidelink beam training (BT) reference signal (BTRS) a first number of times on each of a first set of beams, means for transmitting a sidelink discovery message a second number of times on each of a second set of beams, wherein each beam from the second set of beams is associated with at least one beam from the first set of beams, and receiving, from at least one responder UE after the transmission of the sidelink BTRSs and the sidelink discovery messages, a BT response signal and a sidelink discovery response message on a beam corresponding to one of the first set of beams.

The aforementioned means may be one or more of the aforementioned components of the apparatus 1902 and/or the processing system 2014 of the apparatus 1902 configured to perform the functions recited by the aforementioned means.

Figure 21:
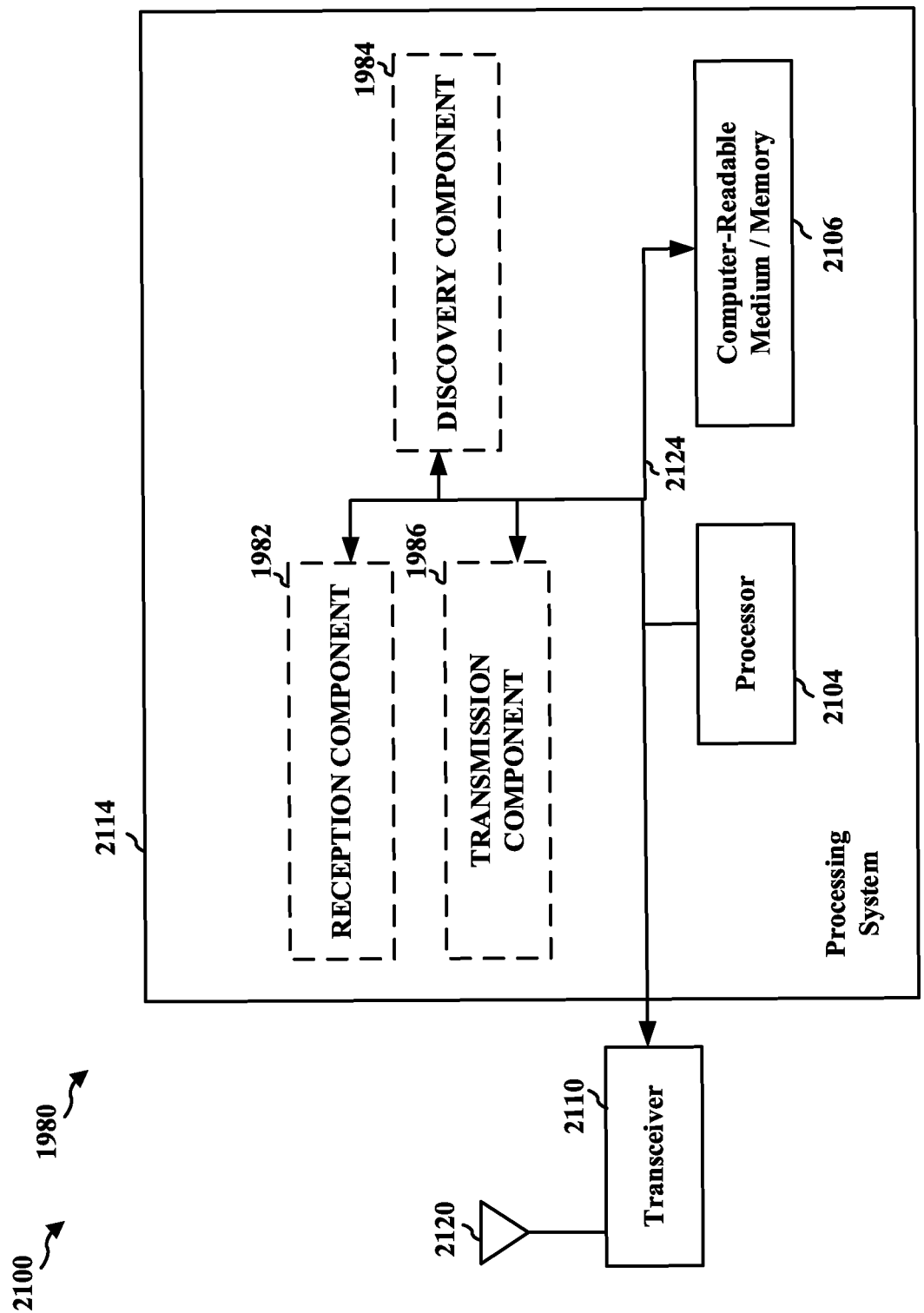

FIG. 21 is a diagram 2100 illustrating an example of a hardware implementation for an apparatus 1980 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 1982, 1984 and 1986, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 1982. In addition, the transceiver 2110 receives information from the processing system 2114, specifically the transmission component 1986, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 1982, 1984 and 1986. The components may be software components running in the processor 2104, resident/stored in the computer readable medium/memory 2106, one or more hardware components coupled to the processor 2104, or some combination thereof.

In one configuration, the apparatus 1980 (e.g., a UE) for wireless communication may include means for receiving, from an initiator UE, a sidelink beam training (BT) reference signal (BTRS) a first number of times on each of a first set of beams, means for receiving, from the initiator UE, a sidelink discovery message a second number of times on each of a second set of beams, wherein each beam from the second set of beams is associated with at least one beam from the first set of beams, and means for transmitting, to the initiator UE, a BT response signal and a sidelink discovery response message on a beam that corresponds to one of the first set of beams.

The aforementioned means may be one or more of the aforementioned components of the apparatus 1980 and/or the processing system 2114 of the apparatus 1980 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating an initiator user equipment (UE), comprising: transmitting a sidelink beam training (BT) reference signal (BTRS) a first number of times on each of a first set of beams; transmitting a sidelink discovery message a second number of times on each of a second set of beams, wherein each beam from the second set of beams is associated with at least one beam from the first set of beams; and receiving, from at least one responder UE after the transmission of the sidelink BTRSs and the sidelink discovery messages, a BT response signal and a sidelink discovery response message on a beam corresponding to one of the first set of beams.

Clause 2. The method of clause 1, wherein the transmission of the sidelink discovery messages follows the transmission of the sidelink BTRSs.

Clause 3. The method of any of clauses 1 to 2, wherein the transmission of the sidelink BTRSs follows the transmission of the sidelink discovery messages.

Clause 4. The method of any of clauses 1 to 3, wherein the first number of times is the same as the second number of times.

Clause 5. The method of any of clauses 1 to 4, wherein the first number of times is greater than the second number of times.

Clause 6. The method of any of clauses 1 to 5, wherein each beam among the first set of beams is associated with the same width as each beam among the second set of beams.

Clause 7. The method of clause 6, wherein there is a 1:1 mapping between the first set of beams and the second set of beams.

Clause 8. The method of any of clauses 1 to 7, wherein each beam among the first set of beams is associated with a first width, and wherein each beam among the second set of beams is associated with a second width that is wider than the first width.

Clause 9. The method of clause 8, wherein there is a N:1 mapping between the first set of beams and the second set of beams, with N being greater than 1.

Clause 10. The method of any of clauses 1 to 9, wherein two or more beams among the first set of beams correspond to a single beam among the second set of beams.

Clause 11. The method of any of clauses 1 to 10, wherein the sidelink BTRSs are transmitted in order between successively adjacent beams among the first set of beams, or wherein the sidelink discovery messages are transmitted in order between successively adjacent beams among the second set of beams, or a combination thereof.

Clause 12. The method of any of clauses 1 to 11, wherein the sidelink BTRSs are transmitted via interleaving of the first set of beams, or wherein the sidelink discovery messages are transmitted via interleaving of the second set of beams, or a combination thereof.

Clause 13. The method of any of clauses 1 to 12, wherein the BT response signal comprises a preamble or a message.

Clause 14. A method of operating responder user equipment (UE), comprising: receiving, from an initiator UE, a sidelink beam training (BT) reference signal (BTRS) a first number of times on each of a first set of beams; receiving, from the initiator UE, a sidelink discovery message a second number of times on each of a second set of beams, wherein each beam from the second set of beams is associated with at least one beam from the first set of beams; and transmitting, to the initiator UE, a BT response signal and a sidelink discovery response message on a beam that corresponds to one of the first set of beams.

Clause 15. The method of clause 14, wherein the reception of the sidelink discovery messages follows the reception of the sidelink BTRSs.

Clause 16. The method of any of clauses 14 to 15, wherein the reception of the sidelink BTRSs follows the reception of the sidelink discovery messages.

Clause 17. The method of any of clauses 14 to 16, wherein the first number of times is the same as the second number of times.

Clause 18. The method of any of clauses 14 to 17, wherein the first number of times is greater than the second number of times.

Clause 19. The method of any of clauses 14 to 18, wherein each beam among the first set of beams is associated with the same width as each beam among the second set of beams.

Clause 20. The method of clause 19, wherein there is a 1:1 mapping between the first set of beams and the second set of beams.

Clause 21. The method of any of clauses 14 to 20, wherein each beam among the first set of beams is associated with a first width, and wherein each beam among the second set of beams is associated with a second width that is wider than the first width.

Clause 22. The method of clause 21, wherein there is a N:1 mapping between the first set of beams and the second set of beams, with N being greater than 1.

Clause 23. The method of any of clauses 14 to 22, wherein two or more beams among the first set of beams correspond to a single beam among the second set of beams.

Clause 24. The method of any of clauses 14 to 23, wherein the sidelink BTRSs are received in order between successively adjacent beams among the first set of beams, or wherein the sidelink discovery messages are received in order between successively adjacent beams among the second set of beams, or a combination thereof.

Clause 25. The method of any of clauses 14 to 24, wherein the sidelink BTRSs are received via interleaving of the first set of beams, or wherein the sidelink discovery messages are received via interleaving of the second set of beams, or a combination thereof.

Clause 26. The method of any of clauses 14 to 25, wherein the BT response signal comprises a preamble or a message.

Clause 27. An initiator user equipment (UE), comprising: a memory; at least one transceiver; and at least one processor communicatively coupled to the memory and the at least one transceiver, the at least one processor configured to: transmit, via the at least one transceiver, a sidelink beam training (BT) reference signal (BTRS) a first number of times on each of a first set of beams; transmit, via the at least one transceiver, a sidelink discovery message a second number of times on each of a second set of beams, wherein each beam from the second set of beams is associated with at least one beam from the first set of beams; and receive, via the at least one transceiver, from at least one responder UE after the transmission of the sidelink BTRSs and the sidelink discovery messages, a BT response signal and a sidelink discovery response message on a beam corresponding to one of the first set of beams.

Clause 28. The initiator UE of clause 27, wherein the transmission of the sidelink discovery messages follows the transmission of the sidelink BTRSs.

Clause 29. The initiator UE of any of clauses 27 to 28, wherein the transmission of the sidelink BTRSs follows the transmission of the sidelink discovery messages.

Clause 30. The initiator UE of any of clauses 27 to 29, wherein the first number of times is the same as the second number of times.

Clause 31. The initiator UE of any of clauses 27 to 30, wherein the first number of times is greater than the second number of times.

Clause 32. The initiator UE of any of clauses 27 to 31, wherein each beam among the first set of beams is associated with the same width as each beam among the second set of beams.

Clause 33. The initiator UE of clause 32, wherein there is a 1:1 mapping between the first set of beams and the second set of beams.

Clause 34. The initiator UE of any of clauses 27 to 33, wherein each beam among the first set of beams is associated with a first width, and wherein each beam among the second set of beams is associated with a second width that is wider than the first width.

Clause 35. The initiator UE of clause 34, wherein there is a N:1 mapping between the first set of beams and the second set of beams, with N being greater than 1.

Clause 36. The initiator UE of any of clauses 27 to 35, wherein two or more beams among the first set of beams correspond to a single beam among the second set of beams.

Clause 37. The initiator UE of any of clauses 27 to 36, wherein the sidelink BTRSs are transmitted in order between successively adjacent beams among the first set of beams, or wherein the sidelink discovery messages are transmitted in order between successively adjacent beams among the second set of beams, or a combination thereof.

Clause 38. The initiator UE of any of clauses 27 to 37, wherein the sidelink BTRSs are transmitted via interleaving of the first set of beams, or wherein the sidelink discovery messages are transmitted via interleaving of the second set of beams, or a combination thereof.

Clause 39. The initiator UE of any of clauses 27 to 38, wherein the BT response signal comprises a preamble or a message.

Clause 40. A responder user equipment (UE), comprising: a memory; at least one transceiver; and at least one processor communicatively coupled to the memory and the at least one transceiver, the at least one processor configured to: receive, via the at least one transceiver, from an initiator UE, a sidelink beam training (BT) reference signal (BTRS) a first number of times on each of a first set of beams; receive, via the at least one transceiver, from the initiator UE, a sidelink discovery message a second number of times on each of a second set of beams, wherein each beam from the second set of beams is associated with at least one beam from the first set of beams; and transmit, via the at least one transceiver, to the initiator UE, a BT response signal and a sidelink discovery response message on a beam that corresponds to one of the first set of beams.

Clause 41. The responder UE of clause 40, wherein the reception of the sidelink discovery messages follows the reception of the sidelink BTRSs.

Clause 42. The responder UE of any of clauses 40 to 41, wherein the reception of the sidelink BTRSs follows the reception of the sidelink discovery messages.

Clause 43. The responder UE of any of clauses 40 to 42, wherein the first number of times is the same as the second number of times.

Clause 44. The UE of any of clauses 40 to 43, wherein the first number of times is greater than the second number of times.

Clause 45. The responder UE of any of clauses 40 to 44, wherein each beam among the first set of beams is associated with the same width as each beam among the second set of beams.

Clause 46. The responder UE of clause 45, wherein there is a 1:1 mapping between the first set of beams and the second set of beams.

Clause 47. The responder UE of any of clauses 40 to 46, wherein each beam among the first set of beams is associated with a first width, and wherein each beam among the second set of beams is associated with a second width that is wider than the first width.

Clause 48. The responder UE of clause 47, wherein there is a N:1 mapping between the first set of beams and the second set of beams, with N being greater than 1.

Clause 49. The responder UE of any of clauses 40 to 48, wherein two or more beams among the first set of beams correspond to a single beam among the second set of beams.

Clause 50. The responder UE of any of clauses 40 to 49, wherein the sidelink BTRSs are received in order between successively adjacent beams among the first set of beams, or wherein the sidelink discovery messages are received in order between successively adjacent beams among the second set of beams, or a combination thereof.

Clause 51. The responder UE of any of clauses 40 to 50, wherein the sidelink BTRSs are received via interleaving of the first set of beams, or wherein the sidelink discovery messages are received via interleaving of the second set of beams, or a combination thereof.

Clause 52. The responder UE of any of clauses 40 to 51, wherein the BT response signal comprises a preamble or a message.

Clause 53. An initiator user equipment (UE), comprising: means for transmitting a sidelink beam training (BT) reference signal (BTRS) a first number of times on each of a first set of beams; means for transmitting a sidelink discovery message a second number of times on each of a second set of beams, wherein each beam from the second set of beams is associated with at least one beam from the first set of beams; and means for receiving, from at least one responder UE after the transmission of the sidelink BTRSs and the sidelink discovery messages, a BT response signal and a sidelink discovery response message on a beam corresponding to one of the first set of beams.

Clause 54. The initiator UE of clause 53, wherein the transmission of the sidelink discovery messages follows the transmission of the sidelink BTRSs.

Clause 55. The initiator UE of any of clauses 53 to 54, wherein the transmission of the sidelink BTRSs follows the transmission of the sidelink discovery messages.

Clause 56. The initiator UE of any of clauses 53 to 55, wherein the first number of times is the same as the second number of times.

Clause 57. The initiator UE of any of clauses 53 to 56, wherein the first number of times is greater than the second number of times.

Clause 58. The initiator UE of any of clauses 53 to 57, wherein each beam among the first set of beams is associated with the same width as each beam among the second set of beams.

Clause 59. The initiator UE of clause 58, wherein there is a 1:1 mapping between the first set of beams and the second set of beams.

Clause 60. The initiator UE of any of clauses 53 to 59, wherein each beam among the first set of beams is associated with a first width, and wherein each beam among the second set of beams is associated with a second width that is wider than the first width.

Clause 61. The initiator UE of clause 60, wherein there is a N:1 mapping between the first set of beams and the second set of beams, with N being greater than 1.

Clause 62. The initiator UE of any of clauses 53 to 61, wherein two or more beams among the first set of beams correspond to a single beam among the second set of beams.

Clause 63. The initiator UE of any of clauses 53 to 62, wherein the sidelink BTRSs are transmitted in order between successively adjacent beams among the first set of beams, or wherein the sidelink discovery messages are transmitted in order between successively adjacent beams among the second set of beams, or a combination thereof.

Clause 64. The initiator UE of any of clauses 53 to 63, wherein the sidelink BTRSs are transmitted via interleaving of the first set of beams, or wherein the sidelink discovery messages are transmitted via interleaving of the second set of beams, or a combination thereof.

Clause 65. The initiator UE of any of clauses 53 to 64, wherein the BT response signal comprises a preamble or a message.

Clause 66. A responder user equipment (UE), comprising: means for receiving, from an initiator UE, a sidelink beam training (BT) reference signal (BTRS) a first number of times on each of a first set of beams; means for receiving, from the initiator UE, a sidelink discovery message a second number of times on each of a second set of beams, wherein each beam from the second set of beams is associated with at least one beam from the first set of beams; and means for transmitting, to the initiator UE, a BT response signal and a sidelink discovery response message on a beam that corresponds to one of the first set of beams.

Clause 67. The responder UE of clause 66, wherein the reception of the sidelink discovery messages follows the reception of the sidelink BTRSs.

Clause 68. The responder UE of any of clauses 66 to 67, wherein the reception of the sidelink BTRSs follows the reception of the sidelink discovery messages.

Clause 69. The responder UE of any of clauses 66 to 68, wherein the first number of times is the same as the second number of times.

Clause 70. The responder UE of any of clauses 66 to 69, wherein the first number of times is greater than the second number of times.

Clause 71. The responder UE of any of clauses 66 to 70, wherein each beam among the first set of beams is associated with the same width as each beam among the second set of beams.

Clause 72. The responder UE of clause 71, wherein there is a 1:1 mapping between the first set of beams and the second set of beams.

Clause 73. The responder UE of any of clauses 66 to 72, wherein each beam among the first set of beams is associated with a first width, and wherein each beam among the second set of beams is associated with a second width that is wider than the first width.

Clause 74. The responder UE of clause 73, wherein there is a N:1 mapping between the first set of beams and the second set of beams, with N being greater than 1.

Clause 75. The responder UE of any of clauses 66 to 74, wherein two or more beams among the first set of beams correspond to a single beam among the second set of beams.

Clause 76. The responder UE of any of clauses 66 to 75, wherein the sidelink BTRSs are received in order between successively adjacent beams among the first set of beams, or wherein the sidelink discovery messages are received in order between successively adjacent beams among the second set of beams, or a combination thereof.

Clause 77. The responder UE of any of clauses 66 to 76, wherein the sidelink BTRSs are received via interleaving of the first set of beams, or wherein the sidelink discovery messages are received via interleaving of the second set of beams, or a combination thereof.

Clause 78. The responder UE of any of clauses 66 to 77, wherein the BT response signal comprises a preamble or a message.

Clause 79. A non-transitory computer-readable medium storing computer-executable instructions that, when executed by an initiator user equipment (UE), cause the UE to: transmit a sidelink beam training (BT) reference signal (BTRS) a first number of times on each of a first set of beams; transmit a sidelink discovery message a second number of times on each of a second set of beams, wherein each beam from the second set of beams is associated with at least one beam from the first set of beams; and receive, from at least one responder UE after the transmission of the sidelink BTRSs and the sidelink discovery messages, a BT response signal and a sidelink discovery response message on a beam corresponding to one of the first set of beams.

Clause 80. The non-transitory computer-readable medium of clause 79, wherein the transmission of the sidelink discovery messages follows the transmission of the sidelink BTRSs.

Clause 81. The non-transitory computer-readable medium of any of clauses 79 to 80, wherein the transmission of the sidelink BTRSs follows the transmission of the sidelink discovery messages.

Clause 82. The non-transitory computer-readable medium of any of clauses 79 to 81, wherein the first number of times is the same as the second number of times.

Clause 83. The non-transitory computer-readable medium of any of clauses 79 to 82, wherein the first number of times is greater than the second number of times.

Clause 84. The non-transitory computer-readable medium of any of clauses 79 to 83, wherein each beam among the first set of beams is associated with the same width as each beam among the second set of beams.

Clause 85. The non-transitory computer-readable medium of clause 84, wherein there is a 1:1 mapping between the first set of beams and the second set of beams.

Clause 86. The non-transitory computer-readable medium of any of clauses 79 to 85, wherein each beam among the first set of beams is associated with a first width, and wherein each beam among the second set of beams is associated with a second width that is wider than the first width.

Clause 87. The non-transitory computer-readable medium of clause 86, wherein there is a N:1 mapping between the first set of beams and the second set of beams, with N being greater than 1.

Clause 88. The non-transitory computer-readable medium of any of clauses 79 to 87, wherein two or more beams among the first set of beams correspond to a single beam among the second set of beams.

Clause 89. The non-transitory computer-readable medium of any of clauses 79 to 88, wherein the sidelink BTRSs are transmitted in order between successively adjacent beams among the first set of beams, or wherein the sidelink discovery messages are transmitted in order between successively adjacent beams among the second set of beams, or a combination thereof.

Clause 90. The non-transitory computer-readable medium of any of clauses 79 to 89, wherein the sidelink BTRSs are transmitted via interleaving of the first set of beams, or wherein the sidelink discovery messages are transmitted via interleaving of the second set of beams, or a combination thereof.

Clause 91. The non-transitory computer-readable medium of any of clauses 79 to 90, wherein the BT response signal comprises a preamble or a message.

Clause 92. A non-transitory computer-readable medium storing computer-executable instructions that, when executed by a responder user equipment (UE), cause the UE to: receive, from an initiator UE, a sidelink beam training (BT) reference signal (BTRS) a first number of times on each of a first set of beams; receive, from the initiator UE, a sidelink discovery message a second number of times on each of a second set of beams, wherein each beam from the second set of beams is associated with at least one beam from the first set of beams; and transmit, to the initiator UE, a BT response signal and a sidelink discovery response message on a beam that corresponds to one of the first set of beams.

Clause 93. The non-transitory computer-readable medium of clause 92, wherein the reception of the sidelink discovery messages follows the reception of the sidelink BTRSs.

Clause 94. The non-transitory computer-readable medium of any of clauses 92 to 93, wherein the reception of the sidelink BTRSs follows the reception of the sidelink discovery messages.

Clause 95. The non-transitory computer-readable medium of any of clauses 92 to 94, wherein the first number of times is the same as the second number of times.

Clause 96. The non-transitory computer-readable medium of any of clauses 92 to 95, wherein the first number of times is greater than the second number of times.

Clause 97. The non-transitory computer-readable medium of any of clauses 92 to 96, wherein each beam among the first set of beams is associated with the same width as each beam among the second set of beams.

Clause 98. The non-transitory computer-readable medium of clause 97, wherein there is a 1:1 mapping between the first set of beams and the second set of beams.

Clause 99. The non-transitory computer-readable medium of any of clauses 92 to 98, wherein each beam among the first set of beams is associated with a first width, and wherein each beam among the second set of beams is associated with a second width that is wider than the first width.

Clause 100. The non-transitory computer-readable medium of clause 99, wherein there is a N:1 mapping between the first set of beams and the second set of beams, with N being greater than 1.

Clause 101. The non-transitory computer-readable medium of any of clauses 92 to 100, wherein two or more beams among the first set of beams correspond to a single beam among the second set of beams.

Clause 102. The non-transitory computer-readable medium of any of clauses 92 to 101, wherein the sidelink BTRSs are received in order between successively adjacent beams among the first set of beams, or wherein the sidelink discovery messages are received in order between successively adjacent beams among the second set of beams, or a combination thereof.

Clause 103. The non-transitory computer-readable medium of any of clauses 92 to 102, wherein the sidelink BTRSs are received via interleaving of the first set of beams, or wherein the sidelink discovery messages are received via interleaving of the second set of beams, or a combination thereof.

Clause 104. The non-transitory computer-readable medium of any of clauses 92 to 103, wherein the BT response signal comprises a preamble or a message.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating an initiator user equipment (UE), comprising:
   transmitting a sidelink beam training (BT) reference signal (BTRS) a first number of times on each of a first set of beams;
   transmitting a sidelink discovery message a second number of times on each of a second set of beams, wherein each beam from the second set of beams is associated with at least one beam from the first set of beams; and
   receiving, from at least one responder UE after the transmission of the sidelink BTRSs and the sidelink discovery messages, a BT response signal and a sidelink discovery response message on a beam corresponding to one of the first set of beams;
   wherein each beam among the first set of beams is associated with a first width, and each beam among the second set of beams is associated with a second width that is wider than the first width.

2. The method of claim 1, wherein the transmission of the sidelink discovery messages follows the transmission of the sidelink BTRSs.

3. The method of claim 1, wherein the transmission of the sidelink BTRSs follows the transmission of the sidelink discovery messages.

4. The method of claim 1, wherein the first number of times is the same as the second number of times.

5. The method of claim 1, wherein the first number of times is greater than the second number of times.

6. The method of claim 1, wherein each beam among the first set of beams is associated with the same width as each beam among the second set of beams.

7. The method of claim 6, wherein there is a 1:1 mapping between the first set of beams and the second set of beams.

8. The method of claim 1, wherein there is a N:1 mapping between a width of each beam in the first set of beams and the width of each beam in the second set of beams, with N being greater than 1.

9. The method of claim 1, wherein two or more beams among the first set of beams correspond to a single beam among the second set of beams.

10. The method of claim 1,
    wherein the sidelink BTRSs are transmitted in order between successively adjacent beams among the first set of beams, or
    wherein the sidelink discovery messages are transmitted in order between successively adjacent beams among the second set of beams, or
    a combination thereof.

11. The method of claim 1,
wherein the sidelink BTRSs are transmitted via interleaving of the first set of beams, or
wherein the sidelink discovery messages are transmitted via interleaving of the second set of beams, or
a combination thereof.

12. The method of claim 1, wherein the BT response signal comprises a preamble or a message.

13. A method of operating responder user equipment (UE), comprising:
receiving, from an initiator UE, a sidelink beam training (BT) reference signal (BTRS) a first number of times on each of a first set of beams;
receiving, from the initiator UE, a sidelink discovery message a second number of times on each of a second set of beams, wherein each beam from the second set of beams is associated with at least one beam from the first set of beams; and
transmitting, to the initiator UE, a BT response signal and a sidelink discovery response message on a beam that corresponds to one of the first set of beams;
wherein each beam among the first set of beams is associated with a first width, and each beam among the second set of beams is associated with a second width that is wider than the first width.

14. The method of claim 13, wherein the reception of the sidelink discovery messages follows the reception of the sidelink BTRSs.

15. The method of claim 13, wherein the reception of the sidelink BTRSs follows the reception of the sidelink discovery messages.

16. The method of claim 13, wherein the first number of times is the same as the second number of times.

17. The method of claim 13, wherein the first number of times is greater than the second number of times.

18. The method of claim 13, wherein each beam among the first set of beams is associated with the same width as each beam among the second set of beams.

19. The method of claim 18, wherein there is a 1:1 mapping between the first set of beams and the second set of beams.

20. The method of claim 13, wherein there is a N:1 mapping between a width of each beam in the first set of beams and the width of each beam in the second set of beams, with N being greater than 1.

21. The method of claim 13, wherein two or more beams among the first set of beams correspond to a single beam among the second set of beams.

22. The method of claim 13,
wherein the sidelink BTRSs are received in order between successively adjacent beams among the first set of beams, or
wherein the sidelink discovery messages are received in order between successively adjacent beams among the second set of beams, or
a combination thereof.

23. The method of claim 13,
wherein the sidelink BTRSs are received via interleaving of the first set of beams, or
wherein the sidelink discovery messages are received via interleaving of the second set of beams, or
a combination thereof.

24. The method of claim 13, wherein the BT response signal comprises a preamble or a message.

25. An initiator user equipment (UE), comprising:
a memory;
at least one transceiver; and
at least one processor communicatively coupled to the memory and the at least one transceiver, the at least one processor configured to:
transmit, via the at least one transceiver, a sidelink beam training (BT) reference signal (BTRS) a first number of times on each of a first set of beams;
transmit, via the at least one transceiver, a sidelink discovery message a second number of times on each of a second set of beams, wherein each beam from the second set of beams is associated with at least one beam from the first set of beams; and
receive, via the at least one transceiver, from at least one responder UE after the transmission of the sidelink BTRSs and the sidelink discovery messages, a BT response signal and a sidelink discovery response message on a beam corresponding to one of the first set of beams;
wherein each beam among the first set of beams is associated with a first width, and each beam among the second set of beams is associated with a second width that is wider than the first width.

26. The initiator UE of claim 25,
wherein the sidelink BTRSs are transmitted in order between successively adjacent beams among the first set of beams, or
wherein the sidelink discovery messages are transmitted in order between successively adjacent beams among the second set of beams, or
wherein the sidelink BTRSs are transmitted via interleaving of the first set of beams, or
wherein the sidelink discovery messages are transmitted via interleaving of the second set of beams, or
a combination thereof.

27. A responder user equipment (UE), comprising:
a memory;
at least one transceiver; and
at least one processor communicatively coupled to the memory and the at least one transceiver, the at least one processor configured to:
receive, via the at least one transceiver, from an initiator UE, a sidelink beam training (BT) reference signal (BTRS) a first number of times on each of a first set of beams;
receive, via the at least one transceiver, from the initiator UE, a sidelink discovery message a second number of times on each of a second set of beams, wherein each beam from the second set of beams is associated with at least one beam from the first set of beams; and
transmit, via the at least one transceiver, to the initiator UE, a BT response signal and a sidelink discovery response message on a beam that corresponds to one of the first set of beams;
wherein each beam among the first set of beams is associated with a first width, and each beam among the second set of beams is associated with a second width that is wider than the first width.

28. The responder UE of claim 27,
wherein the sidelink BTRSs are received in order between successively adjacent beams among the first set of beams, or
wherein the sidelink discovery messages are received in order between successively adjacent beams among the second set of beams, or
wherein the sidelink BTRSs are received via interleaving of the first set of beams, or wherein the sidelink discovery messages are received via interleaving of the second set of beams, or a combination thereof.

29. The method of claim 1, wherein the first set of beams includes two or more beams, and the second set of beams includes two or more beams.

\* \* \* \* \*